United States Patent
Sims

[19]

[11] Patent Number: 5,918,911
[45] Date of Patent: *Jul. 6, 1999

[54] REPLACEMENT AND REPAIR OF NOZZLES FOR PRESSURE VESSELS

[75] Inventor: William Sims, Russellville, Ark.

[73] Assignee: Entergy Arkansas, Inc., Little Rock, Ark.

[ * ] Notice: This patent is subject to a terminal disclaimer.

[21] Appl. No.: 08/558,328

[22] Filed: Nov. 15, 1995

Related U.S. Application Data

[63] Continuation-in-part of application No. 08/239,177, May 6, 1994, Pat. No. 5,605,361.

[51] Int. Cl.$^6$ .............................. G21C 13/00; F16L 41/14
[52] U.S. Cl. .............................. 285/13; 285/15; 285/206; 285/197; 285/211; 285/187; 285/220; 376/307; 376/260; 376/204
[58] Field of Search .............................. 285/15, 197, 192, 285/381, 221, 219, 220, 211, 208, 206, 187, 212, 13, 14; 29/402.01, 890.031, 402.07, 906, 447; 138/97; 376/204, 260, 307; 165/76

[56] References Cited

U.S. PATENT DOCUMENTS

| | | | |
|---|---|---|---|
| 1,658,525 | 2/1928 | Nousley . | |
| 1,817,850 | 8/1931 | Schwalback . | |
| 2,711,841 | 6/1955 | Schaefer et al. | 285/192 |
| 2,800,912 | 7/1957 | McCamish et al. . | |
| 2,874,749 | 2/1959 | Brink | 285/192 |
| 2,935,341 | 5/1960 | Steinen | 285/192 |
| 3,114,414 | 12/1963 | Judd . | |
| 3,348,850 | 10/1967 | Scales | 285/192 |
| 3,491,198 | 1/1970 | Mangels | 439/559 |
| 3,746,308 | 7/1973 | Vatterott | 285/197 |
| 4,255,840 | 3/1981 | Loch et al. . | |
| 4,319,961 | 3/1982 | Coussau et al. . | |
| 4,400,020 | 8/1983 | Keller . | |
| 4,436,117 | 3/1984 | Martin . | |
| 4,440,339 | 4/1984 | Tamai et al. | 228/119 |
| 4,480,841 | 11/1984 | Schukei et al. . | |
| 4,553,776 | 11/1985 | Dodd . | |
| 4,570,983 | 2/1986 | Olenfalk et al. . | |
| 4,573,248 | 3/1986 | Hackett . | |
| 4,611,813 | 9/1986 | Guerrero . | |
| 4,615,477 | 10/1986 | Spada et al. | 228/1 |
| 4,655,483 | 4/1987 | Margotta . | |

(List continued on next page.)

OTHER PUBLICATIONS

RTD Nozzle Seal Assembly advertisement of ABB Combustion Engineering Nuclear Operations, Combustion Engineering, Inc.

*Primary Examiner*—Eric K. Nicholson
*Attorney, Agent, or Firm*—Cowan, Liebowitz & Latman, P.C.

[57] ABSTRACT

For nozzle replacement, repair and initial installation in ASME pressure vessels, disclosed are nozzles, nozzle assemblies and nozzle repair assemblies, all of which are mechanically attached and mechanically sealed to the vessel, i.e., without any welding to the vessel, and in most embodiments without any welding at all. For nozzle replacement, a part or the entire existing nozzle is removed and a partial or full replacement nozzle or nozzle assembly is mechanically attached and mechanically sealed to the vessel. For nozzle repair, the existing nozzle within the bore is not removed, and a mechanical seal is provided for the existing nozzle which may also be welded or mechanically attached to the repair assembly. Also disclosed are: a corrosion resistant leak path or paths past the nozzle to the exterior of the vessel and beyond the insulation surrounding the vessel such that any leakage can visually be detected; an anti-rotation device or devices which prevent a mechanically attached nozzle part from rotating relative to the vessel; and an assembly which rotatably couples a sleeve threaded to the bore or a clamp device and a nozzle or nozzle body so that the sleeve may be tightened without breaking a weld between the nozzle and the assembly which attaches the nozzle to the sleeve; and a clamp which releasably frictionally engages a nozzle and releasably attaches it to a sleeve or flange that is mechanically attached to the vessel.

65 Claims, 19 Drawing Sheets

U.S. PATENT DOCUMENTS

| | | | |
|---|---|---|---|
| 4,664,425 | 5/1987 | Bona | 285/330 |
| 4,676,717 | 6/1987 | Willyard, Jr. et al. . | |
| 4,723,795 | 2/1988 | Shenoy . | |
| 4,786,461 | 11/1988 | Veronesi et al. . | |
| 4,826,217 | 5/1989 | Guerrero . | |
| 4,877,271 | 10/1989 | McCorkle et al. . | |
| 4,996,018 | 2/1991 | Bhatt et al. . | |
| 5,079,837 | 1/1992 | Vanselow . | |
| 5,091,140 | 2/1992 | Dixon et al. . | |
| 5,094,801 | 3/1992 | Dixon et al. . | |
| 5,149,490 | 9/1992 | Brown et al. . | |
| 5,196,160 | 3/1993 | Porowski . | |
| 5,197,177 | 3/1993 | Gieger . | |
| 5,202,082 | 4/1993 | Brown et al. . | |
| 5,209,895 | 5/1993 | Wivagg . | |
| 5,271,048 | 12/1993 | Behnke et al. . | |
| 5,274,683 | 12/1993 | Broda et al. | 376/260 |
| 5,278,878 | 1/1994 | Porowski . | |
| 5,297,187 | 3/1994 | Sodergren et al. . | |
| 5,323,428 | 6/1994 | Porter et al. . | |
| 5,367,678 | 11/1994 | Weems . | |
| 5,404,382 | 4/1995 | Russ et al. | 376/260 |
| 5,513,227 | 4/1996 | Margotta et al. . | |
| 5,603,361 | 2/1997 | Sims | 285/220 |
| 5,619,546 | 4/1997 | Porter et al. . | |
| 5,631,936 | 5/1997 | Theroux et al. . | |
| 5,675,618 | 10/1997 | Amburn et al. . | |

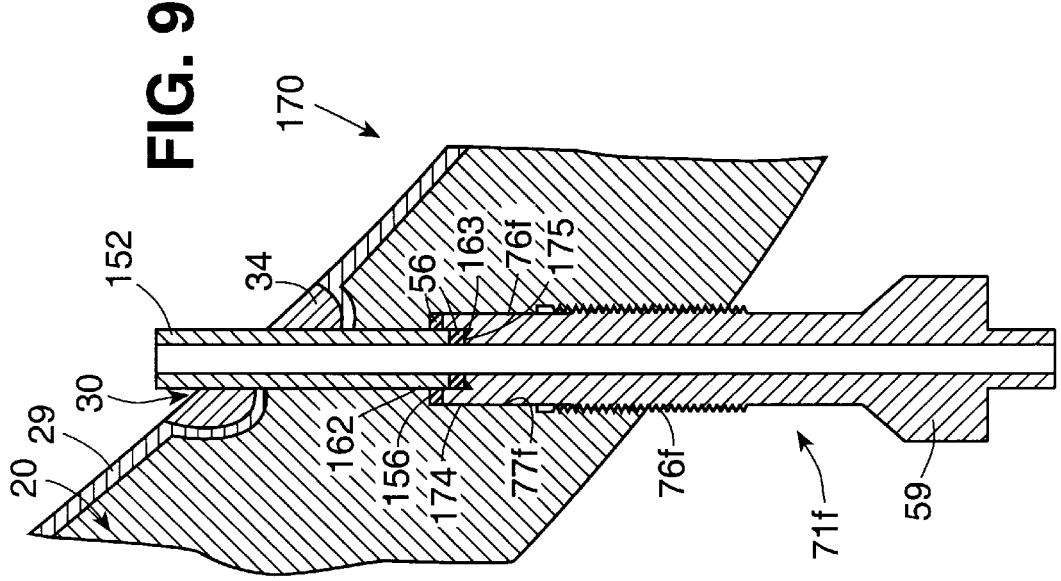
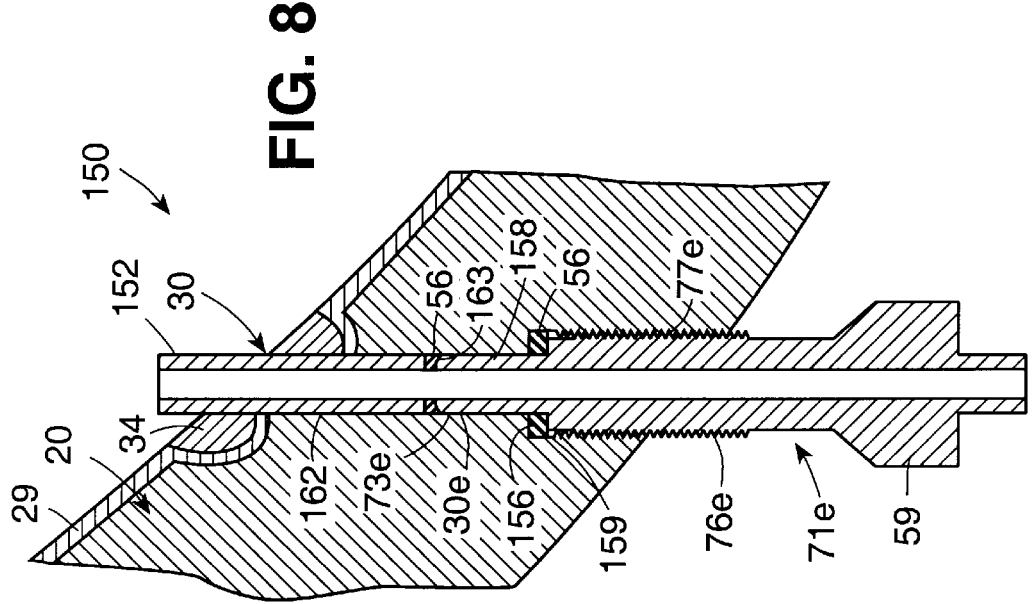

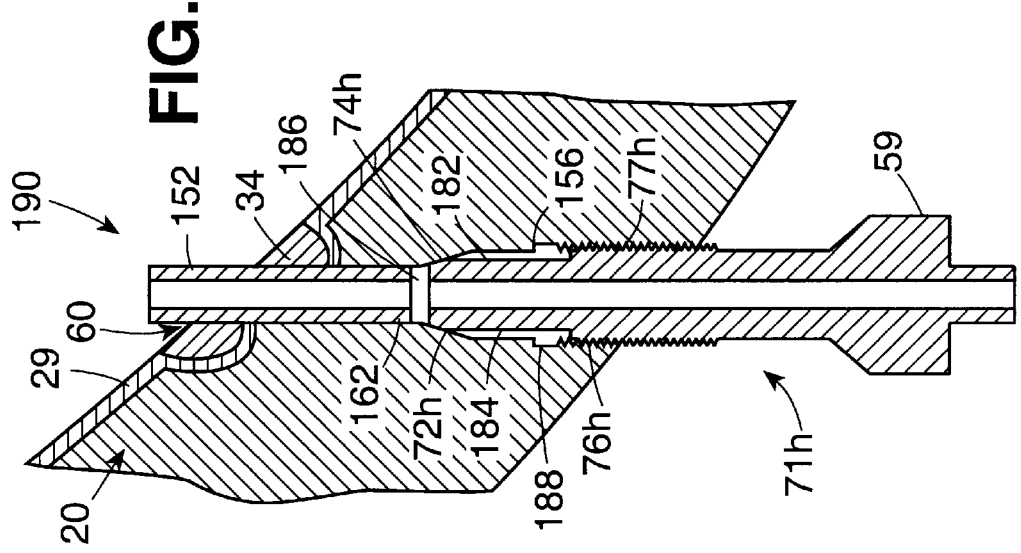
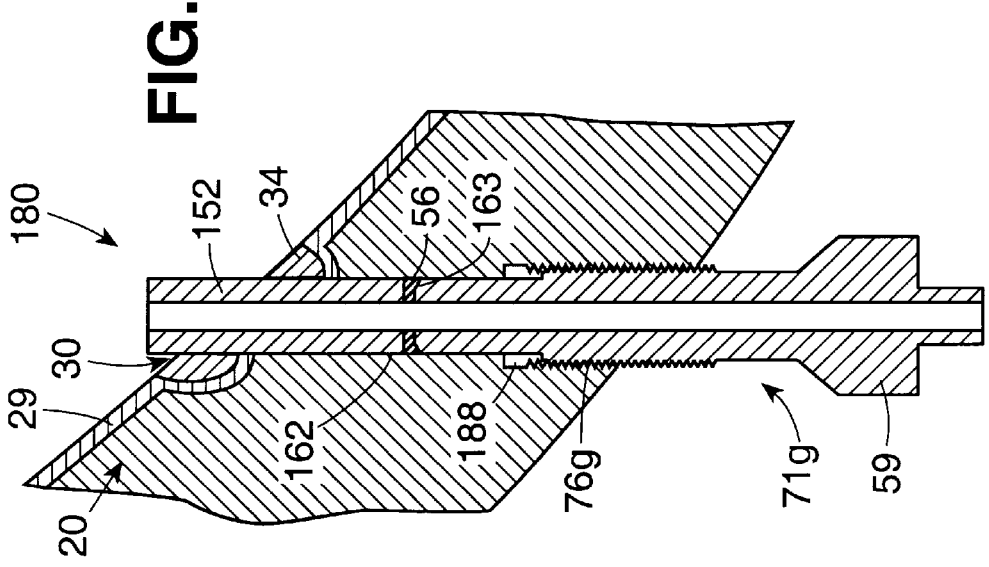

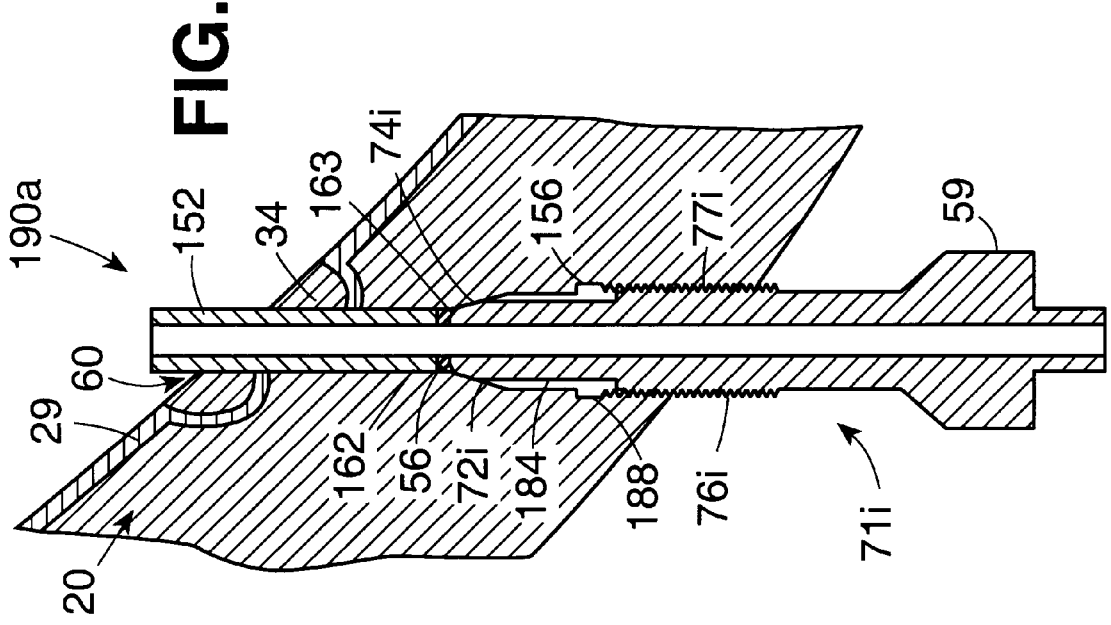
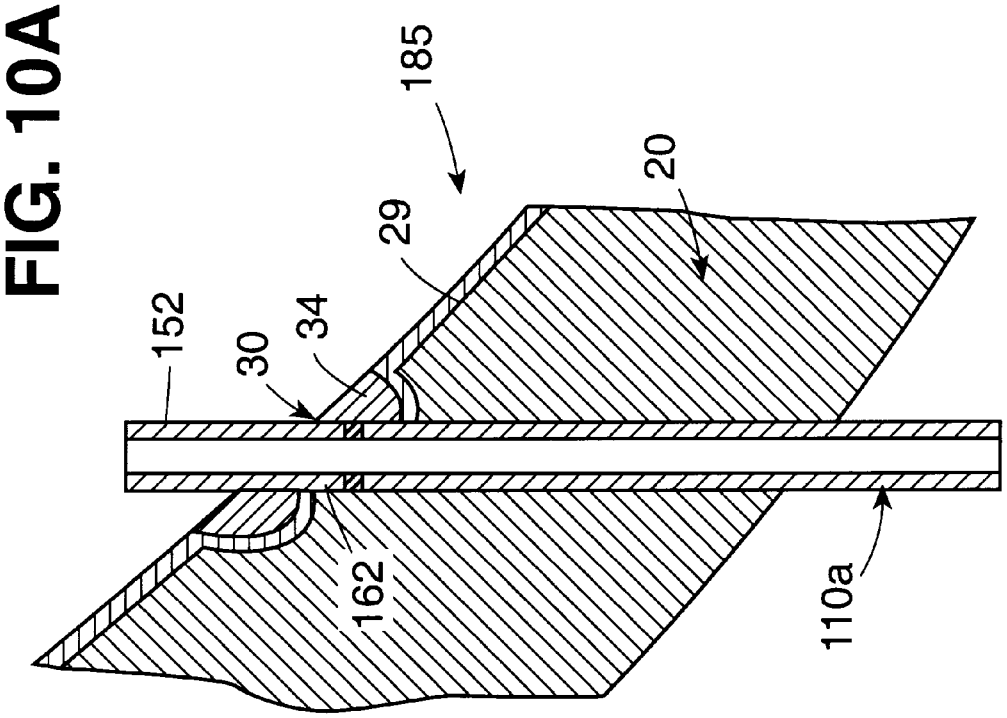

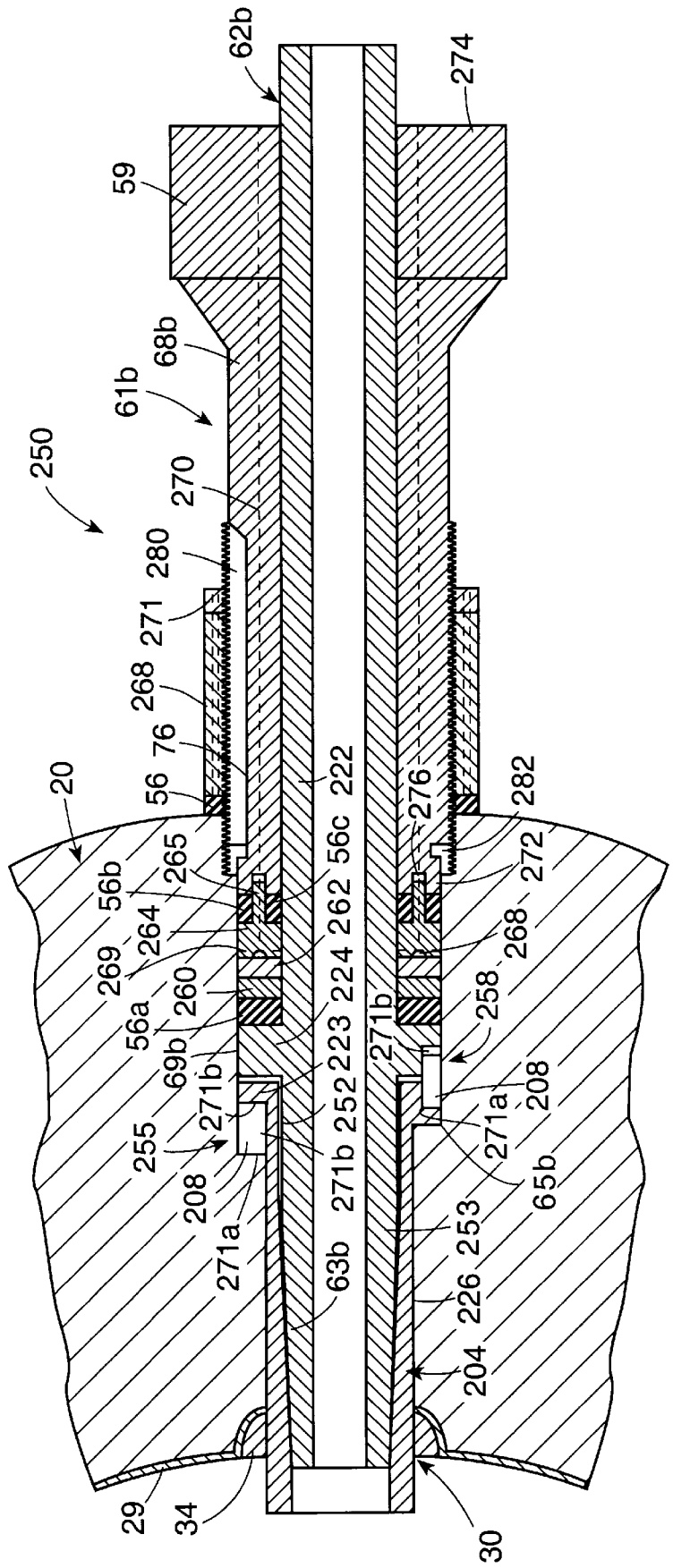

REPLACEMENT AND REPAIR OF NOZZLES FOR PRESSURE VESSELS

This application is a continuation-in-part of application Ser. No. 08/239,177 filed May 6, 1994, (now U.S. Pat. No. 5,605,361) titled "REPLACEMENT OF NOZZLES FOR PRESSURE VESSELS AND METHOD OF ATTACHING SAME". The entire contents and disclosure of application Ser. No. 08/239,177 (referred to below as "the prior application") are hereby incorporated herein by reference.

BACKGROUND OF THE INVENTION

The invention disclosed herein relates to nozzles, nozzle assemblies, and nozzle repair assemblies for vessels and piping that are installed either initially or as replacements without any welding at all to the vessel. (A "nozzle" may be, or include as part thereof, a sleeve and/or, piping. A "vessel" may also be large bore piping.) The invention more particularly relates to nozzles, nozzle assemblies, nozzle repair assemblies and procedures which replace or repair nozzles that are attached to the vessel on the inside diameter of the vessel with a J groove structural weld. (The term "nozzle assembly" is sometimes interchangeably used herein with the term "partial nozzle assembly" which encompasses an assembly that includes part of an existing nozzle and a partial replacement nozzle or the term "full nozzle assembly" which encompasses an assembly that includes a full replacement nozzle. Both partial and full nozzle assemblies in addition may include components such as gaskets, packing glands, a spring, and anti-rotation and leak path devices etc. These assemblies provide a mechanical attachment of a nozzle to a vessel, a mechanical seal of a nozzle, or both. The term "nozzle repair assembly" encompasses an existing nozzle and a structure which mechanically seals the existing nozzle or attaches the existing nozzle to the vessel without welding to the vessel, or both.) The invention has particular application to nozzles, nozzle assemblies, nozzle repair assemblies and procedures which replace, repair or initially install nozzles in ASME pressure vessels and large bore piping of pressurized water reactor (PWR) nuclear power facilities, either because a nozzle has failed, or to prevent future failure or leakage due to a phenomenon known as Primary Water Stress Corrosion Cracking, PWSCC. Repair of a nozzle also encompasses plugging the bore, for example, replacing a heater with a plug. Further, the invention relates to replacement and repair of nozzles and assemblies that were previously replaced or repaired.

A typical PWR nuclear power generating facility includes in part a reactor vessel, steam generator, pressurizer vessel, and a reactor coolant piping system, all of which operate under high pressure. Nozzles are attached to the vessels and/or piping for a number of purposes, e.g., for connecting piping and instrumentation, vents, and to secure control element drive mechanisms and heater elements. A typical pressurizer vessel 20 is shown in FIG. 1 with nozzles 22 for vents, nozzles 24 for sample or liquid level, nozzles 25 (one of which is shown behind nozzle 24) for pressure sensing, a nozzle 26 for temperature measuring, and a number of nozzles 27 for heating elements. All of those nozzles were heretofore welded to the pressurizer vessel at the time of original manufacture.

As shown in FIG. 2, inconel or stainless cladding 29 is welded to the interior of the pressurizer vessel which is made of carbon steel. The nozzle 26 shown in 5 cross section in FIG. 2, which is exemplary of the welded nozzles 22 and 24–27, passes through a hole or bore 30 in the pressurizer vessel 20 and is structurally welded at its interior end 32 to the vessel 20 with a J-groove weld 34 along the interior opening to the bore 30. The diameter of nozzle 32 is slightly less than the diameter of bore 30, so that there is a small annular space 36 between the nozzle exterior and the wall of bore 30. In some applications the nozzles are fit tight to the bore, and in a control rod drive mechanism, they are installed with a shrink fit process. The J-groove weld 34 also functions as a seal weld to seal the annular space 36. A reactor vessel (not shown) similarly has nozzles represented by nozzle 26 in FIG. 2 welded thereto. The piping of the reactor coolant system (not shown) also includes similar nozzles welded thereto. Further details of pressurizer vessels, reactor vessels, and coolant system piping, in particular, and nuclear power facilities, in general, are known to those of skill in the art.

As mentioned, the invention has particular application to the replacement of nozzles which have failed, and to the prevention of nozzle failures and leakage in nuclear power facilities due to the PWSCC phenomenon, which occurs on components having a susceptible material, high tensile stresses, high temperature and which are in a corrosive environment, conditions which primarily exist on nozzle penetrations in the pressurizer vessel, reactor coolant piping, and the reactor vessel. Such failures are manifested by cracking, which the applicant recognized resulted from several contributing factors. Such cracking occurs at the grain boundaries on the inside diameter of the nozzle material (Alloy 600) at or near the heat affected zone of the weld and propagates radially outward through the thickness of the nozzle which eventually leads to small leakage of the reactor coolant supply. Recently, failures have also occurred on stainless steel pressurizer nozzles though the failure mechanism is not known.

As indicated, nozzles of these types have failed over time and have had to be replaced or repaired, either because of a failure in the nozzle or the weld attaching and sealing the nozzle to the vessel. A typical replacement procedure in a nuclear power plant environment requires shutting down the nuclear power plant, removing the nozzle, which typically requires machining operations, and welding a replacement nozzle to the vessel or piping. The welded replacement nozzles currently in use closely duplicate the original welded nozzle they replace, except that they may be made of a different alloy, e.g., Alloy 690 (less susceptible to PWSCC) instead of Alloy 600, and may also be represented by the nozzle shown in FIG. 2. Other weld repair methods involve installing a thick weld pad on the outside of the vessel and structurally welding the nozzle to the pad, and seal welding the interior end of the nozzle to the vessel. Other refinements to this method involve inserting a thin sleeve between the nozzle and vessel, seal welding the thin sleeve on the inside diameter of the vessel, and structurally welding the thin sleeve and nozzle on the outside of the vessel. This methodology promotes less weld residual stress and eliminates the axial thermal stresses imposed since the nozzle is now free ended and allowed to grow thermally when the vessel heats up. Still another derivative of the weld pad designs is the use of a partial nozzle instead of a full nozzle. With this approach, only a portion of the nozzle is removed leaving the cracked portion of the nozzle remaining in place. A partial nozzle is structurally welded to the weld pad leaving approximately a 1/16" to 1/8" gap between the existing and new nozzle. A final derivative of the weld pad is replacing a portion of the existing heater nozzle, otherwise known as a heater sleeve, with a plug instead of a partial nozzle or sleeve, which is used due to the inherent difficulties of aligning the replacement nozzle such that the heaters can be reinstalled. Therefore, the failed heater location is abandoned in place with the plug preventing further leakage. Also, a heater sleeve may be plugged because a replacement for the failed heater is not available during the repair period, typically a scheduled outage. The heater will then be replaced during next scheduled outage.

The above partial nozzle replacement and plugs are normally used as last resorts since the carbon steel vessel is exposed to reactor coolant containing boric acid which can corrode the vessel and since the failed nozzle can continue to crack with the crack propagating into the base material of the vessel. Boric acid corrosion, though a concern, has not proven to corrode the vessel bore to any sufficient depth for at least one nozzle installed in the steam space in the pressurizer, which is in a low oxygen, stagnant environment. However, corrosion could be a concern for those areas with high fluid flow such as nozzles on reactor coolant piping.

Another method of plugging a heater location, though currently not used in the industry, involves removing a portion of the existing nozzle, inserting a new nozzle with split flared ends that compress during insertion and expand once the nozzle is fully inserted such that the flared ends overlap the inboard end of the existing nozzle relying on the integrity of the existing nozzle and weld to prevent ejection of the replaced nozzle. Once the split flared nozzle is installed, a portion of the nozzle is then rolled with high compressive load expanding the rolled area into the vessel bore, thereby forming a seal therebetween. After the rolled joint is formed a steel rod is inserted through the nozzle past the split flared ends, which prevents them from compressing inward, and a seal weld is applied at the outside diameter of the vessel at the nozzle and rod interface. The inherent problem with this plug is the rolled joint. The rolling process causes a compressive stress layer in the joint itself, but at the interface between the rolled and non rolled area, high tensile stresses are imposed which promote cracking. Cracking has been observed in the rolled transition region on similar repairs used for steam generator A600 tubes. Though this method uses A690 as the replacement material, A690 is not believed to be immune from PWSCC. Furthermore, the rolled joint may not be reliable to form a seal for extended periods because of relaxation over time in the rolled area. Any leakage here would cause severe corrosion to the outside of the vessel because as the reactor coolant leaks to the atmosphere, it flashes to steam and is in a highly oxygenated environment.

Replacements employing the above-described procedures in a nuclear power plant currently require a minimum of approximately fourteen days for some types of nozzles (although some claim a minimum of seven to ten days), and are extremely expensive. Including the lost revenue resulting from plant shut-down, which may be as high as $750,000 per day, the total cost of each repair can result in several millions dollars if the repair has to be performed in a non-scheduled facility shut down.

The above-described nozzle replacement and repair procedures and any other replacement and repair procedure that requires welding to the vessel not only is time consuming and therefore expensive, but also exposes repair personnel to more radiation than the replacement and repair procedures disclosed herein, particularly where the nozzle replacement or repair procedure involves personnel entering inside the vessel to perform the procedure. Also, both the original welded nozzle and the known welded replacement nozzles and methods subject the welded nozzle to high residual stresses imposed by weld shrinkage. These high residual stresses increase the susceptibility to PWSCC. Thus, the welded replacement nozzle offers no improvement over the original nozzle in terms of expected life and reduction of failures, other than any improvement that may result from use of a superior nozzle material. Although, Alloy 690 material is less susceptible to PWSCC than Alloy 600, it is not known that the change in nozzle material alone will not eliminate the possibility of nozzle failures. At least three utilities have replaced nozzles using the original design criteria, Alloy 690 material for the nozzle, and alloy 600 weld material, and have experienced failures in the weld material itself. Based on this information, improved nozzle replacement and repair methods are needed.

There now appears to be some recognition in the field that replacement and/or repair of nozzles in pressure vessels of nuclear power plants may proceed without structurally welding a replacement nozzle to the vessel. For example, U.S. Pat. Nos. 5,149,490 and 5,202,082 (both of Brown et al.) and U.S. Pat. No. 5,404,382 (Russ et al.) (see FIGS. 8 and 9) describe methods and apparatus for replacing a nozzle for a pressurizer vessel without structurally welding the nozzle to the vessel. Although the replacement nozzles of the '490 and '382 patents are mechanically attached to the pressurizer vessel, according to these patents welding is still required to provide the seal between the nozzle and the pressurizer vessel. Therefore, the residual stresses discussed above are imposed on the nozzle by the weld whether it be a structural weld or a seal weld, which imposes less stress than a structural weld. The '382 patent discloses with respect to FIGS. 8 and 9 that the weld seams are free from loading because the nozzle is prestressed in a such a way that axial and horizontal forces acting on the nozzle are compensated for. Here, as understood by the applicant, the purpose of the prestressing is to compress the tapered nozzle against the vessel bore to eliminate lateral movement of the nozzle and bending at the weld location. It appears that the replacement procedure disclosed in the '382 patent can only be used in those locations where the inside of the vessel can be accessed such as the reactor head. This method cannot be used in the heater locations and most likely could not be used in the reactor coolant piping (typically 28" piping located in a confined area, with a high dose rate that can not be easily shielded).

In the replacement procedure and nozzle described in the '082 patent, the original welded nozzle is not fully removed, and a mechanical seal is made between the remaining cracked nozzle portion and the end of the replacement nozzle. Leaving part of the existing nozzle at the interior welded may lead to future cracking in the existing failed portion of the Alloy 600 nozzle that was not removed from the vessel. However, further cracking in the base material of the vessel would not likely result in reactor coolant leakage. Experience and analysis indicate that the base material of the vessel will only crack some minimum distance into the base material which will not jeopardize the integrity of the vessel. Boric acid corrosion for this design is less of a concern than the partial nozzle welded design discussed above due to the fact that there is not an exposed gap between the new and existing nozzle thereby limiting or eliminating boric acid from contacting the vessel. Partial nozzle designs not having sealing capabilities between the new and existing nozzle can be justified readily where the nozzles are located in stagnant region of the pressurizer vessel, e.g. the liquid space or the upper steam space because there is a limited amount of bore cavity available for the stagnant boric acid to collect and oxidize between fuel cycles and because the reactant coolant has a low oxygen content. Further, if corrosion does occur, a protective oxidation layer will form which resists further corrosion in the stagnant environment. Therefore, partial nozzle replacements without a seal between the existing nozzle and the partial replacement nozzle appear to be justified for the life of the plant. For those locations in which the partial nozzle replacement without the seal is not in a stagnant environment, i.e., reactor coolant piping, additional evaluations are required to justify extended usage. Partial nozzle designs with the seal between the existing nozzle and the partial replacement nozzle can be used in stagnant environment locations and at high fluid flow locations; however, a better design practice would be to remove the cracked nozzle to eliminate further degradation of the vessel. The procedure described in the '082 patent thus has the drawback that a portion of the failed nozzle remains structurally welded to the vessel and therefore continues to subject the vessel to the same stresses as the original nozzle, although, as mentioned above, there now appears to be justification for employing partial nozzle replacements. In any event, the remaining nozzle portion and the vessel portion surrounding the bore opening are subject to further degradation.

As far as the applicant is aware, the replacement nozzles and replacement procedures disclosed in the '490 and '082 patents have not been used in a nuclear power facility anywhere, and the replacement nozzles and nozzle replacement procedures disclosed in FIGS. 8 and 9 of the '382 patent have not been used in a nuclear power facility in the United States.

A repair procedure has also been developed which does not use welded replacements and plugs. This repair procedure involves leaving the existing nozzle installed, installing a split flange exterior to the vessel, applying a split seal at the outside diameter of the vessel and nozzle interface, and providing an unloaded anti-ejection device. In the event the existing nozzle were to crack due to PWSCC, the seal at the outside of the vessel is intended to prevent reactor coolant leakage. This repair procedure is intended as a preventative leakage measure as opposed to an ASME code section XI type of repair or replacement. Nuclear Regulatory approval may be required before this repair procedure could be used. However, it has already been installed at one utility as a preventive measure. This methodology does not prevent PWSCC from occurring. However, without further evaluation it is unknown by the applicant if the repair is acceptable for the life of the plant. It is possible that if the nozzle began to crack at numerous locations, the crack could propagate axially from the J-groove weld to beyond the seal incorporated at the flange. However, if this occurred it would not be a significant safety concern but would require additional repairs.

The following U.S. patents relate to installing, replacing, repairing or sealing nozzles, sleeves, tubes or plugs in pressure vessels and piping: U.S. Pat. No. 2,711,841 (Schaefer et al.); U.S. Pat. No. 4,255,840 (Loch et al.); U.S. Pat. No. 4,440,339 (Tamai et al.); U.S. Pat. No. 4,480,841 (Schukei et al.); U.S. Pat. No. 4,615,477 (Spada et al.); U.S. Pat. No. 4,653,483 (Margotta); U.S. Pat. No. 4,723,795 (Shenoy); U.S. Pat. No. 4,826,217 (Guerrero); U.S. Pat. No. 5,091,140 (Dixon et al.); U.S. Pat. No. 5,094,801 (Dixon et al.); U.S. Pat. No. 5,196,160 (Porowski); U.S. Pat. No. 5,209,895 (Wivagg); U.S. Pat. No. 5,271,048 (Behake et al.); U.S. Pat. No. 5,274,683 (Broda et al.); U.S. Pat. No. 5,278,878 (Porowski); U.S. Pat. No. 5,297,187 (Sodergren et al.) U.S. Pat. No. 5,323,428 (Porter et al.); and U.S. Pat. No. 5,367,768 (Weems).

Also a method similar to that used in steam generator tube repairs has been proposed with certain modifications to the Nuclear Regulatory Committee for repairing a leaking nozzle. According to the proposal, the existing nozzle is rolled and deformed against the ID of the vessel such that a seal is created between the nozzle and vessel. (See U.S. Pat. No. 5,367,768 (Weems), cited above). Also, an optional A690 sleeve could be rolled into the existing nozzle forming a seal therebetween. A similar design was also proposed for a plug. However, the Nuclear Regulatory Committee declined the proposals because that rolling technique causes high tensile stresses at the rolled transition region which promotes PWSCC, and because that repair method may be only leak limiting which could allow the boric acid in the reactor coolant to erode a portion of the carbon steel vessel.

Nozzles are currently being replaced or repaired in PWR nuclear power facilities both because they have failed and as a preventive measure where a statistical analysis has indicated a high probability of a future failure. Nozzle failures and such statistically indicated failures have been occurring frequently enough to be a major concern for nuclear power plant operators (and owners) for a number of reasons including the high cost of repairs and the millions of dollars in lost revenue due to plant shut down. Therefore, there is a need for procedures for replacing and repairing nozzles that have failed or may fail or leak in the future, that (a) reduce the time and expense required to make the replacement or repair and (b) do not require confined entry into a pressure vessel, which reduce radiation exposure to the personnel performing the replacement or repair, and (c) reduce the susceptibility to PWSCC and do not result in further degradation of the vessel, and accordingly reduce the risk of future failures and leaks. A similar need also exists for a nozzle for initial installation applications and a method of initially installing such a nozzle in a vessel.

The invention disclosed herein addresses the above-described needs and avoids the problems discussed above, and provides original nozzles and nozzle assemblies, replacement nozzles and nozzle assemblies, nozzle repair assemblies and procedures for installing and repairing nozzles and nozzle assemblies mechanically in pressure vessels in nuclear power facilities (and in other fields) that avoid some or all of the problems discussed above, and which do not employ a structural weld or a weld of any kind to the vessel.

OBJECTS AND SUMMARY OF THE INVENTION

It is an object of the invention disclosed herein to reduce the susceptibility to PWSCC of replacement nozzles and initial installation nozzles in nuclear power facilities as much as reasonably achievable, and thereby reduce the possibility of future nozzle failures.

It is another object of the invention to reduce the time and expense involved with installing a replacement or initial installation nozzle, or repairing an existing nozzle in a vessel, particularly in a nuclear power facility.

It is another object of the invention to not require confined entry into a vessel in order to install a replacement or initial installation nozzle in the vessel, or to repair an existing nozzle, particularly in a nuclear power facility.

It is another object of the invention to reduce the exposure to radiation of repair personnel in a nuclear power facility while installing a replacement or initial nozzle installation, or repairing an existing nozzle in a vessel.

It is another object of the invention to install a replacement or initial installation nozzle in a vessel, or repair an existing nozzle without structurally welding the nozzle to the vessel, particularly in a nuclear power facility.

It is another object of the invention to install a replacement or initial installation nozzle in a vessel without any welding at all, particularly in a nuclear power facility.

It is another object of the invention to repair an existing nozzle without any welding at all, or at least without welding the existing nozzle to the vessel, particularly in a nuclear power facility.

It is another object of the invention when replacing a nozzle in a vessel to remove the entire existing nozzle and to install a complete (whole) mechanical nozzle replacement, thereby removing the defective (or possibly defective) portion of the existing nozzle and avoiding further degradation to the vessel.

It is another object of the invention when partially replacing a nozzle in a vessel to not remove the part of the existing nozzle adjacent the interior of the vessel, i.e., to only remove the part of the existing nozzle from a point beyond the J-groove weld to the exterior of the vessel, and to install a partial mechanical nozzle replacement which is sealed to the bore adjacent the remaining nozzle portion, thereby simplifying removal of the existing nozzle.

It is another object of the invention when repairing an existing nozzle to not remove the nozzle at all, but to either provide a mechanical seal for the existing nozzle, or attach the existing nozzle to the vessel without welding the existing nozzle to the vessel, or both.

It is another object of the invention provide a mechanical attachment and/or a mechanical seal in the repair an existing nozzle without employing a weld of any kind, or optionally, a weld that is not made to the vessel, e.g., a weld of the existing nozzle to a clamp or flange device located outside of the vessel.

It is another object of the invention to provide nozzles, nozzle assemblies and nozzle repair assemblies which may be installed in vessels while achieving the objects set forth above.

It is another object of the invention to apply the techniques described herein and in the prior application for full nozzle replacement to partial nozzle replacement and nozzle repair, and to apply the techniques described herein for partial nozzle replacement to full nozzle replacement and nozzle repair.

It is another object of the invention to provide a primary and a secondary seal for applicable replacement and repair assemblies to prevent leakage if the primary seal leaks.

It is another object of the invention to provide a primary corrosion resistant leak path in replacement and repair assemblies so that in the event the primary and secondary seals leak, corrosion of the vessel would not occur.

It is another object of the invention to provide a secondary corrosion resistant leak path in replacement and repair assemblies in the event the primary and secondary seals leak and the primary leak path seals failed, so that corrosion of the vessel would not occur.

It is another object of the invention to provide a leak path or paths which provide a visual indication of any leakage in the leak path.

It is another object of the invention to provide a means to prevent nozzle rotation in replacement and repair assemblies for those parts which may have high torsional loads.

It is another object of the invention to live load the mechanical seals provided by the invention such that seal shrinkage over time will not cause leakage.

The applicant recognized that the effect of high tensile stresses in nozzles introduced by welds that structurally attach and/or seal the nozzle to the vessel and the corrosive effect of coolant within the vessel can be limited by mechanical designs, which are disclosed herein and in the prior application.

The invention(s) disclosed herein and in the prior application achieve the above and other objects by providing full and partial nozzle replacements and full and partial nozzle replacement assemblies for vessels, and repairs for existing nozzles, all of which are mechanically attached to the vessel and mechanically sealed to the vessel, i.e., without any welding at all to the vessel. The invention(s) also provide nozzle replacement and repair procedures for mechanically attaching and mechanically sealing existing nozzles, the full and partial nozzles and nozzle assemblies to the vessel, and for repairing nozzles, also without any welding to the vessel. The replacement and repair techniques, features and arrangements disclosed herein are also applicable to initial nozzle installation. Therefore, "replacement" should be understood to encompass initial installation where applicable. Most embodiments of the invention do not use any weld at all, although some may weld the nozzle to a sleeve or flange that is mechanically attached to the vessel.

The full and partial replacement nozzles and replacement and repair assemblies are flanged, clamped, or bolted or compressively loaded to the vessel, and in some embodiments a part of the replacement nozzle is attached to the vessel with an interference fit. In all embodiments a mechanical seal is obtained using the interference fit between metal surfaces of a part of the nozzle and the vessel (which surfaces may be polished), and/or by use of sealing materials. In most embodiments, the seals are live-loaded to self-compensate for changes in the sealing material after initial installation. Also, in most embodiments, the parts of a nozzle assembly adjustably compressively load the sealing material, so that a part or parts may be tightened after initial installation to compensate for shrinkage of the sealing material. In the case of replacement of an existing nozzle, a part or the entire existing nozzle is removed and a partial or full nozzle or nozzle assembly is mechanically attached and mechanically sealed to the vessel. In the case of repair, the existing nozzle within the bore is not removed, and a mechanical seal is provided for the existing nozzle, and the existing nozzle may also be attached to the vessel without welding it to the vessel. For use in booth replacement and repair, means are also provided to attach the nozzle to the vessel without any welding at all via a clamping arrangement engaged at the nozzle and a drive sleeve. The invention departs significantly from the prior art of nozzle replacement and initial installation by not utilizing a weld of any kind, which eliminates the stresses imposed by welding and significantly reduces the risk of a PWSCC type failure, or by not utilizing any weld at all.

The invention(s) disclosed herein further provide a corrosion resistant leak path or paths past the nozzle or nozzle assembly to the exterior of the vessel should the mechanical seals leak for any reason. The leak path or paths channel any reactor coolant leakage which may occur through a corrosion resistant path out past the exterior surface of the vessel and beyond the insulation surrounding the vessel to the oxygenated environment where the coolant can flash steam without eroding the vessel. Preferably, any leakage in a leak path or leak paths is visible.

Further, the invention(s) disclosed herein provide an anti-rotation device or devices which prevent a mechanically attached nozzle part from rotating relative to the vessel.

Still Further, the invention(s) disclosed herein provide a repair assembly which rotatably couples a sleeve threaded to the bore and a nozzle or nozzle body so that the sleeve may be tightened without breaking a weld between the nozzle and the assembly which attaches the nozzle to the sleeve. This technique allows the sleeve to be torqued to tighten a mechanical seal without having to break the weld.

According to one embodiment of the invention, an existing nozzle in a bore of an ASME pressure vessel is partially replaced by a replacement nozzle or replacement nozzle assembly, which comprises a nozzle stub opening to the interior of the vessel and extending part way into the bore and a partial replacement nozzle or nozzle assembly extending therefrom or spaced therefrom to the exterior of the vessel. The nozzle stub is part of a previously installed nozzle which the nozzle or nozzle assembly is replacing, and is welded to the vessel where the bore opens to the interior of the vessel. The replacement nozzle or nozzle assembly also includes the partial replacement nozzle or assembly extending from adjacent the nozzle stub in the bore, through the bore and exiting the bore to the exterior of the vessel, which is mechanically attached to the vessel, and one or more mechanical seals of the partial replacement nozzle or assembly to the vessel. In some embodiments, a mechanical seal is independent of the existing nozzle stub, and in others cooperates with the nozzle stub to form the mechanical seal.

According to another embodiment of the invention, an existing nozzle in a bore of an ASME pressure vessel is entirely removed and replaced by a full replacement nozzle or replacement nozzle assembly extending from the interior of the vessel, through the bore and exiting the bore to the exterior of the vessel. The full replacement nozzle or assembly is mechanically attached to vessel, and a mechanical seal is made of the full nozzle or assembly to the vessel when the full nozzle or assembly is mechanically attached to the vessel.

In the repair embodiments, the existing nozzle remains welded to the vessel at the opening of the bore extending out of the vessel. A repair assembly is provided comprising a sleeve mechanically attached to the vessel, e.g., by threading the sleeve to the bore or by a flange bolted to the vessel, with the sleeve extending into the bore surrounding a substantial portion of the nozzle in the bore. A mechanical seal of the sleeve to the vessel within the bore is made surrounding the existing nozzle.

If PWSCC were to occur after making a repair as described herein, a portion or all of the existing nozzle may be removed and a partial or full nozzle replacement made as described herein. The adaptation of the bore is the same as in the applicable partial or full nozzle replacement, except that part or all the existing nozzle is removed and a full or partial nozzle is installed.

In the partial and full replacement nozzles and assemblies, and also in the repair assemblies, the mechanical seal or seals may be entirely within the bore or only at the vessel exterior surrounding the bore, or both.

Various mechanical arrangements are disclosed for mechanically attaching partial and full replacement nozzles and assemblies and repair assemblies to the vessel. The nozzle may be one-piece or an assembly including a nozzle body and another part such as a sleeve or flange for mechanically attaching the nozzle body to the vessel. In one embodiment, the nozzle or nozzle assembly or repair assembly may include a sleeve which has exterior threads that engage interior threads in the bore to bolt the nozzle or assembly to the vessel, or the nozzle or assembly may be configured to engage structure in the bore when the nozzle or assembly is tightened in the bore to mechanically compressively load the nozzle or assembly to the vessel. The engaging structure may be interfering sections of the bore and a nozzle part, e.g., tapered sections of a nozzle part and the bore or a tapered sleeve inserted in the bore, or a flanged nozzle part and a shoulder in the bore, or a flange engaged with or attached to a nozzle body exteriorly of the vessel and bolted to the vessel.

In another embodiment, a clamp arrangement frictionally engages the nozzle and a drive sleeve to mechanically attach the nozzle to the vessel without welding.

The mechanical seal may be provided by sealing material, e.g., gasket material or packing material, glands or rings compressed between interfering surfaces of the nozzle or nozzle assembly and the bore or vessel exterior. For example, sealing material may be compressed between tapered surfaces, flanges and shoulders in the bore and an external flange and the vessel exterior, to name a few. Alternatively, a mechanical seal may be provided between contacting surfaces such as are compressively loaded together when the nozzle or nozzle assembly is attached to the vessel or via a shrink fit. Again, the seals may be live-loaded and also the compression thereof may be adjusted.

In partial nozzle replacement embodiments where the nozzle stub remains in the bore and repair embodiments where the entire nozzle remains in the bore, the bore may be enlarged around the existing nozzle and a nozzle, nozzle body or sleeve overlapping the existing nozzle, with sealing material positioned around the existing nozzle compressed by the end of the nozzle, nozzle body or sleeve. This embodiment does not axially load the existing nozzle.

This application discloses additional embodiments of full nozzle replacements, and also discloses embodiments of partial nozzle replacements and existing nozzle repairs. The features and principles disclosed herein and in the prior application may be utilized for full nozzle replacement, partial nozzle replacement and nozzle repair. Thus, it will be apparent to those of skill in the technical field to which this application relates that such features and principles disclosed in connection with one embodiment may be applied to other embodiments.

BRIEF DESCRIPTION OF THE DRAWINGS

The invention is illustrated in the figures of the accompanying drawings which are meant to be exemplary and not limiting, in which like numerals refer to like or corresponding parts, and in which:

FIGS. 8, 9, 10, 10A, 11 and 12 are section views similar to that of FIG. 4, but depicting embodiments of partial nozzle replacement assemblies in which part of the original nozzle is not removed and which incorporate a feature or features of the embodiment of FIG. 4;

FIG. 17 is a section view similar to that of FIG. 14 depicting a full nozzle replacement assembly incorporating a feature or features of the embodiment of FIG. 14 and leak paths, and an anti-rotation device;

DESCRIPTION OF THE PREFERRED EMBODIMENTS

Figure 1:
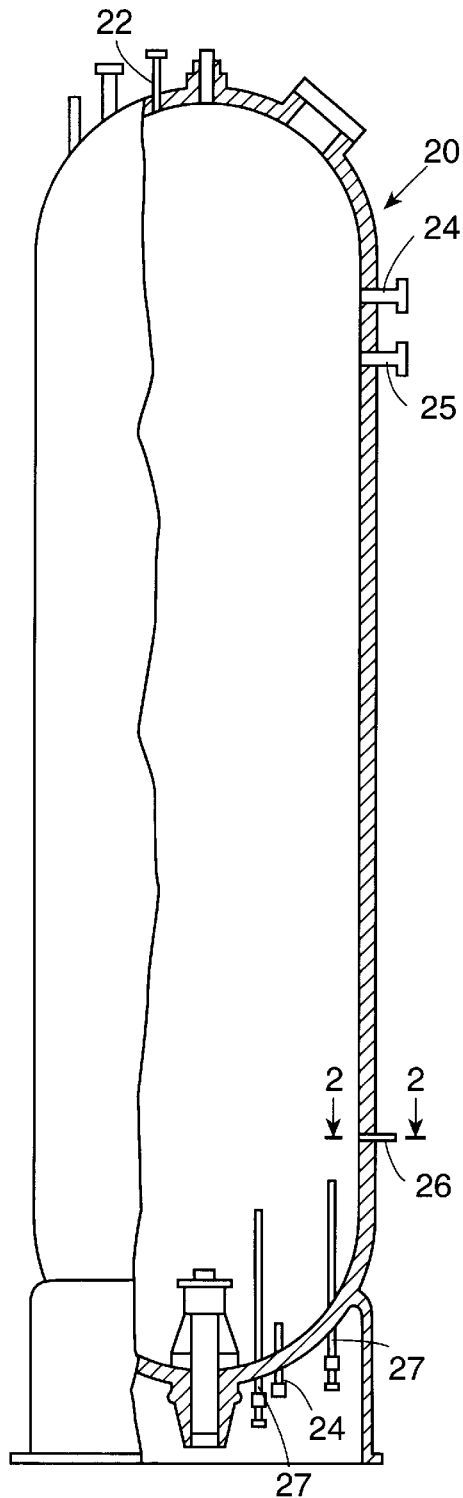
FIG. 1 is an elevation view, partially in vertical section, of a conventional pressurizer vessel in a typical nuclear power generating plant

Although the preferred embodiments illustrated in the drawings are described below in connection with replacement of a welded nozzle in the pressurizer vessel and reactor coolant piping of a nuclear power facility, the invention is not limited to that and encompasses installation of nozzles in other vessels and piping and the repair of existing nozzles. The invention further encompasses the initial installation of nozzles in new as well as in existing vessels and piping. Further, the invention inherently encompasses replacement and repair of nozzles that were previously replaced or repaired. As specifically indicated or suggested herein, or as will be apparent to those of skill in the art, an attachment or sealing system of an embodiment or embodiments described herein, or a feature or features of an embodiment or embodiments described herein may be applicable to, or incorporatable in, other embodiments.

Figure 2:
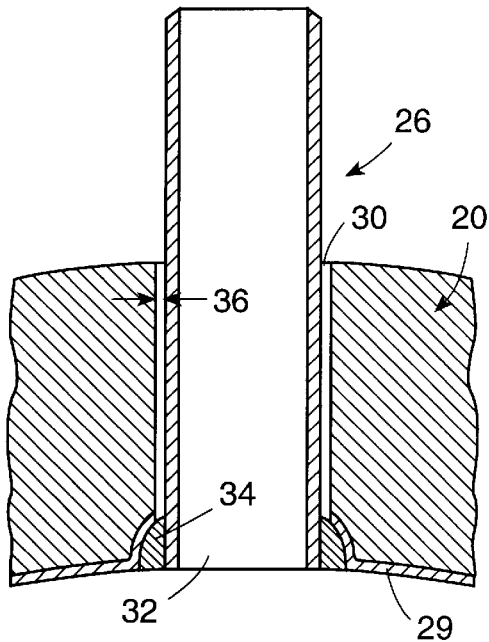
FIG. 2 is a section view of one of the conventional nozzles attached to the vessel depicted in FIG. 1 taken along line 2—2 in FIG. 1.

The embodiments of full replacement nozzles and assemblies depicted in FIGS. 3–7 are identical to those in FIGS. 6, 7, 9, 10 and 12, respectively, of the prior application. In those embodiments, the original welded nozzle 26 (FIG. 2) has been completely removed, leaving the J-groove weld 34 and the cladding 29 surrounding the bore 30 for the nozzle substantially in tact. The old nozzle may be machined or drilled out; therefore destroying the nozzle. In the embodiments depicted in FIGS. 3–7 herein, and in the prior application, the replacement nozzle may be clamped, bolted, flanged, or interference fitted in the bore or hole of the vessel.

Figure 3:
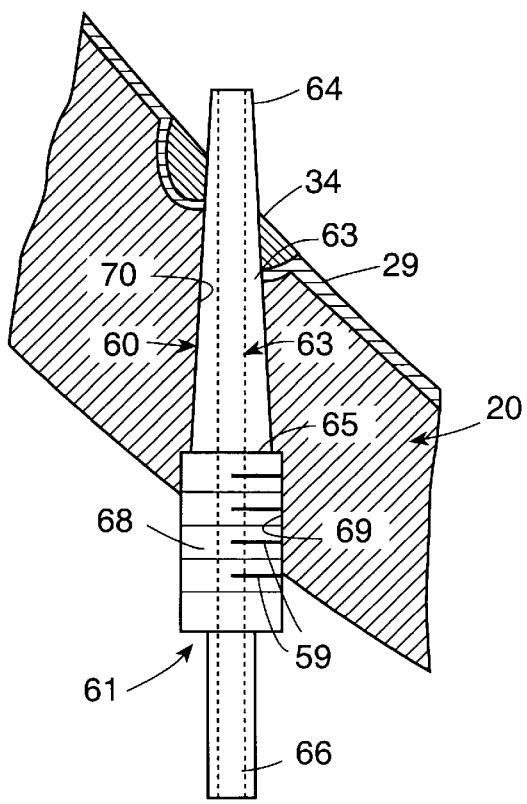
FIGS. 3–7 are section views similar to that of FIG. 2 of embodiments of full replacement nozzles or full nozzle replacement assemblies and part of the vessel depicted in FIG. 1, identical to FIGS. 6, 7, 9, 10 and 12, respectively, of the prior application.

Full nozzle replacement assembly 61 depicted in FIG. 3 (FIG. 6 in the prior application), employs a compressive loading system for mechanically attaching a nozzle body 62 to vessel 20. The compressive loading of the nozzle body 62 is accomplished by bolting a cylindrical sleeve 68 to the bore against the nozzle body 62, which loads the nozzle body in compression within the bore. Here, the nozzle assembly 61 includes the nozzle body 62 and the cylindrical sleeve 68. Loading the nozzle body in compression makes it less susceptible to PWSCC. If a crack developed in the nozzle body due to PWSCC (or any other mechanism), since the nozzle body is loaded in compression, the crack will not propagate, or at least is less likely to propagate. This principle is applied in other mechanical nozzle replacements discussed below. The nozzle body 62 has a tapered portion 63 which may be a full or partial length taper ending in a smaller diameter end 64 projecting from the interior entrance of the bore 60 in the vessel 20 and a larger diameter end 65 within bore 60. The nozzle body 62 also includes a tubular portion 66 projecting from the exterior of the vessel 20. The diameter of the tubular portion 66 is smaller than the larger diameter end 65 of the tapered portion 63, and a flange 67 is formed where the diameter of the bore changes from the smaller to the larger diameter. The nozzle assembly 61 also includes an externally threaded cylindrical sleeve 68, and the bore 60 includes a threaded cylindrical portion 69 and a tapered portion 70. The sleeve 68 has wrenching flats 59 on the exterior circumference thereof for tightening the sleeve in the bore. Tightening the sleeve 68 in the threaded bore portion 69 against the flange 65 of the nozzle body forces the tapered portion 63 of the nozzle body into a compressive mechanical engagement with the tapered portion 70 of the bore 60 to mechanically attach the nozzle body 62 to the vessel 20. A mechanical seal is obtained between the contacting surfaces of the tapered nozzle portion 63 and the tapered bore portion 70 by engagement of the two surfaces, which are polished as described above and in the prior application. Sleeve 68 is tightened sufficiently to ensure that the seal is obtained. Instead of polished surfaces, sealing material as described in the prior application and herein may be positioned within bore portion 70 between the bore wall and the exterior of the nozzle body 63 to create the seal.

If necessary, a spring washer as described in the prior application or a Belville washer may be employed between nozzle sleeve 68 and the flange 65 of the nozzle body 62 to live load the seal, i.e., maintain a resilient compressive loading on the seal which self compensates over time due to seal shrinkage or other factors. The seals in most of the embodiments described herein may similarly be live-loaded by a spring or washer, and specific reference thereto is not made in every such embodiment The sealing material may comprise gasket material or packing material, for example, Grafoil seal material, Grafoil seal rings, packing glands etc., as is known in the art.

Typically, rings and packing materials may be employed where the seal is radially restrained, e.g., the sealing material 56 in FIG. 8 between the bore shoulder 156 and the nozzle flange 159; and gasket material may be employed elsewhere, e.g., the sealing material 56 in FIG. 8 between the end 162 of the nozzle stub 152 and the end 73e of the nozzle 71e. The packing material and packing gland may be of Grafoil, e.g., a Grafoil seal ring as disclosed, for example, in U.S. Pat. No. 4,826,217 (cited above).

Figure 4:
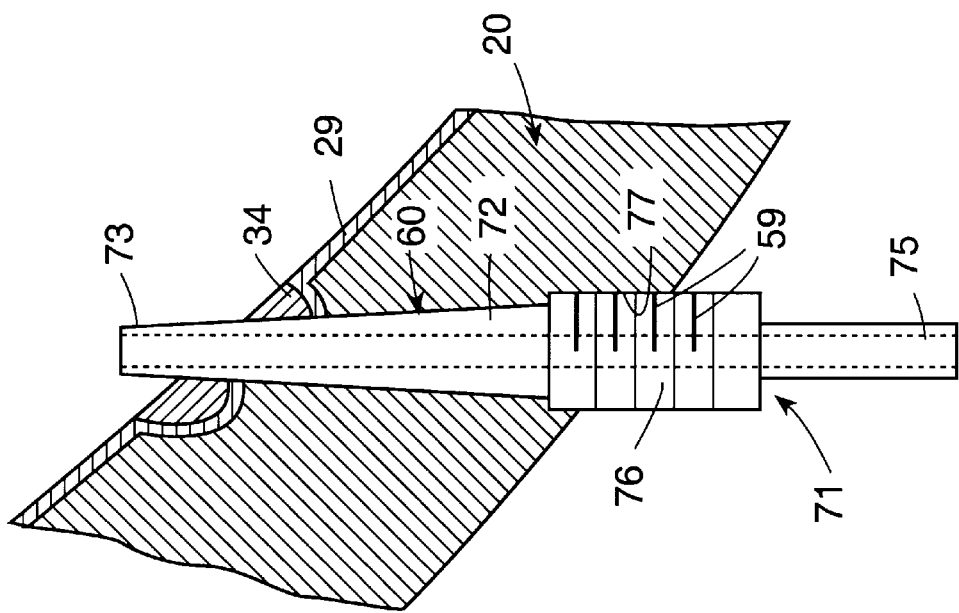

FIG. 4 (FIG. 7 in the prior application) illustrates a replacement nozzle 71 bolted to the vessel. Full nozzle 71 is similar to fill nozzle replacement assembly 61, but is one-piece, and includes a tapered nozzle body 72 having a smaller diameter end 73 at the interior entrance of the tapered bore 60 in the vessel 20, a tubular end 75 projecting from the exterior of the vessel 20 and a larger diameter, tubular threaded portion 76. The diameter of the nozzle body 72 increases from the interior end 73 to the threaded portion 76. (Reference numeral 60 indicates a bore with a full or partial taper in it and numeral 30 indicates a cylindrical bore of a single diameter or a plurality of diameters.) The diameter of bore 60 similarly increases from the interior end of the bore to a cylindrical threaded portion 77 at the exterior end of the bore. Wrenching flats 59 are provided on nozzle body 72 adjacent the threaded portion 76 for tightening the nozzle into the threaded portion 77 of the bore 60. The nozzle 71 is structurally attached to the vessel 20 by tightening the nozzle into the bore, which forces the tapered portion of the nozzle body 72 into compressive mechanical engagement with the tapered bore 60 to mechanically bolt the nozzle body 72 to the vessel 20. A mechanical seal is obtained between the contacting surfaces of the tapered nozzle portion 72 and the tapered bore 60 by engagement of the two surfaces, as described above in connection with FIG. 3 and in the prior application.

Figure 5:
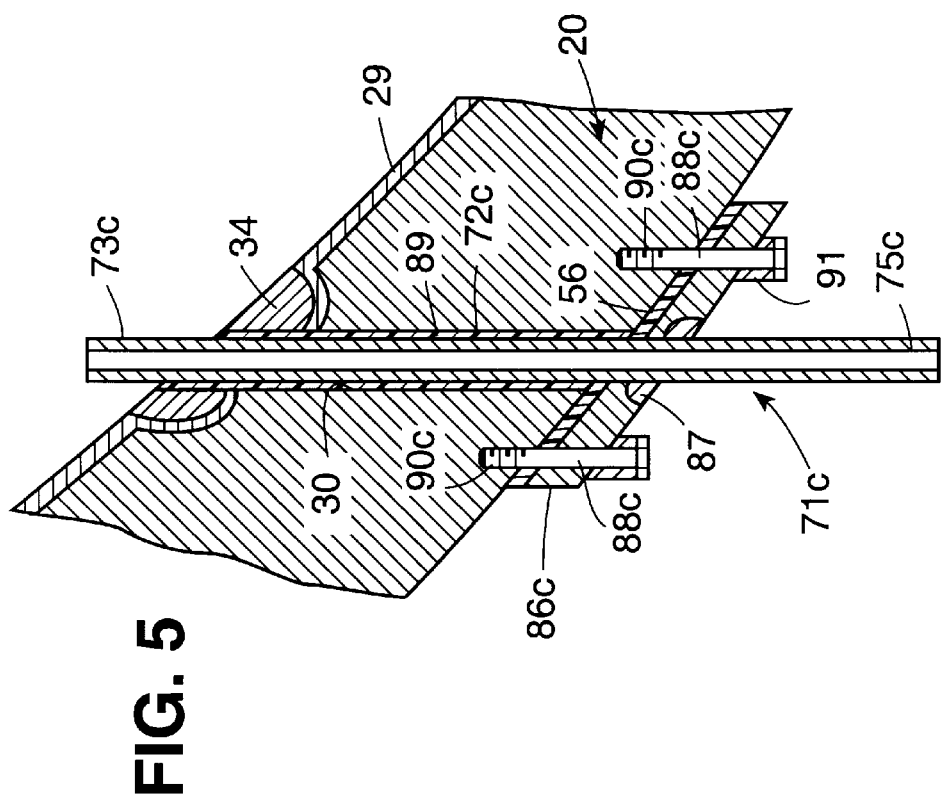

Referring to FIG. 5 (FIG. 10 in the prior application), full nozzle replacement assembly 71c is bolted to vessel 20 by an exterior flange 86c and bolts 88c. Both the nozzle body 72c and the bore 30 are cylindrical, and the mechanical attachment of the nozzle assembly 71c to the vessel is achieved by bolting the flange 86c directly against the exterior wall of the vessel. The flange 86c is a separate piece from the nozzle body 72c and may be attached to the nozzle body in any suitable manner, e.g., by a weld 87 (which should be stressed relieved prior to installation). However, the flange 86c and nozzle body 72c may be formed as one piece, as shown in FIG. 11 of the prior application. The flange 86c is contoured to follow the contour of the exterior wall of the vessel 20 against which it bears. Spacers 91 are provided between the heads of bolts 88c and the flange 86c. A thin corrosion resistant sleeve 89, e.g., made of Alloy 690, is shrink fitted or rolled into bore 30 so as to mechanically seal the sleeve 89 to the bore 30. Sealing material 56 between flange 86c and the exterior vessel wall provides the pressure retaining mechanical seal.

Full nozzle replacement assembly 71b depicted in FIG. 6 (FIG. 9 in the prior application) is compressively mechanically attached to vessel 20 by an exterior flange 86 bolted to the vessel 20 by a plurality of bolts 88 and threaded holes 90 in the exterior wall of the vessel Exterior flange 86 is a separate piece from nozzle 71b (or in an alternate embodiment may be one-piece with or without welding to the nozzle), and is engaged with nozzle assembly 71b as follows. Nozzle assembly 71b includes a tubular end 75b of reduced diameter projecting from the vessel 20 which forms a circular shoulder or flange 92. Flange 86 includes a circular recess 94 with a central hole 96 therein. The shoulder 92 on the nozzle assembly 71b is received in the recess 94 in the flange 86 with the tubular portion 75b of the nozzle body 72b passing through the central hole 96 in the flange's recess 94. Bore 60 and nozzle body 72b are tapered generally as described for nozzle 71 in FIG. 4, and tightening bolts 88 causes the flange 86 to draw the nozzle body 72b into bore 60 into compressive frictional engagement therewith. If necessary, spring washers (not shown) may be provided between the heads of bolts 88 and flange 86. A mechanical seal is obtained between the exterior of the nozzle body 72b and the walls of bore 60, as described above in connection with FIGS. 3 and 4.

Figure 7:
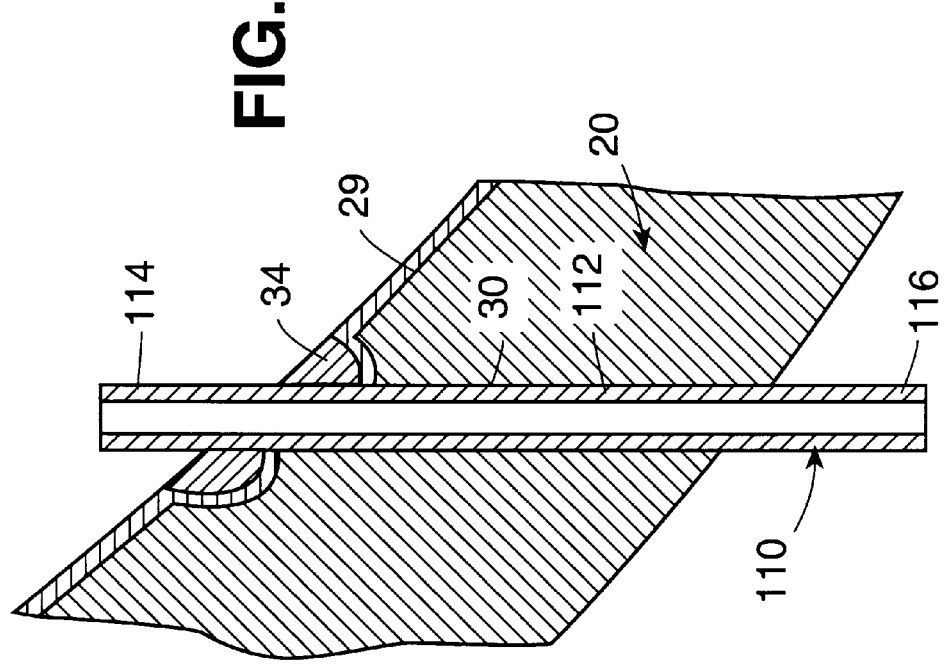

Full nozzle replacement 110 shown in FIG. 7 (FIG. 12 in the prior application) is frictionally attached to the vessel 20 and mechanically sealed by an interference fit of the nozzle 110 in the bore 30. Nozzle 110 is tubular and bore 30 is cylindrical. At equal temperatures of the nozzle 110 and the vessel portion 20 surrounding the bore 30, the diameter of the nozzle is slightly larger than the diameter of the vessel bore. The nozzle 110 is inserted into the bore by creating a substantial temperature gradient between the two so that the diameter of the nozzle is reduced or the diameter of the bore is increased, or both. The temperature of the vessel 20 surrounding the bore 30 is increased to expand the diameter of the bore, or the nozzle 110 is cooled to reduce its diameter, or both. After the nozzle 110 has been inserted into the bore 30, the temperature gradient is reduced so that the nozzle 110 frictionally engages the wall of the bore 30 in an interference fit to both mechanically attach the nozzle and mechanically seal its exterior with the wall of the bore at the operating temperatures of interest. The exterior of the nozzle and the bore are polished to assist in creating a seal therebetween. If desired, a mechanical seal or seals, in addition to the mechanical seal obtained from the interference fit and polished surfaces, may be provided as discussed herein and in the prior application.

FIGS. 8–20 illustrate embodiments of full and partial nozzle replacement assemblies which are improvements over the embodiments illustrated in the prior application (including FIGS. 3–7 of this application which are identical to FIGS. 6, 7, 9, 10 and 12, respectively, of the prior application), and which introduce features not disclosed in the prior application as well as applying features disclosed in the prior application for improved full nozzle replacement and partial nozzle replacement, which may also be applied to nozzle repair. As indicated above, individual features, or combinations of features, from the embodiments of FIGS. 8–20 may be applied to other embodiments, or combined in various combinations.

FIGS. 8, 9, 10, 11 and 12 show variations of the full nozzle replacement 71 of FIG. 4 for partial nozzle replacement assemblies 150, 170, 180, 190 and 190a that include the part (or stub) 152 of an existing nozzle adjacent the interior of the vessel 20 and a partial replacement nozzle 71e, 71f, 71g, 71h and 71i, respectively. For FIG. 10A, the partial nozzle replacement assembly 185 is a variation of the full nozzle replacement of FIG. 7, which includes an existing nozzle stub 152 and a partial replacement nozzle 110*a*. In the embodiments of FIGS. 8, 9, 10, 10A, 11 and 12, a portion of the existing nozzle is removed leaving the nozzle stub 152 extending into or flush to the bore from the interior of the vessel. Both the nozzle stub 152 and its J-groove weld 34 are left in tact and substantially undisturbed. Removal may be accomplished as described above for removal of the entire nozzle, and in other ways which are known to those of skill in this art. The vessel bore may be altered only to the extent of threading it adjacent the exterior of the vessel, and/or it may be enlarged or tapered as described below.

Referring to FIG. 8, a portion 77*e* of the bore 30 adjacent the exterior of the vessel is enlarged in diameter and threaded. A shoulder 156 is formed in the bore 30 at the interface of the larger diameter portion 77*e* and a smaller diameter portion 30*e*. The replacement nozzle 71*e* likewise includes a smaller diameter portion 158 sized to be received in the smaller diameter bore portion 30*e* and a threaded larger diameter portion 76*e* to be threadedly received in the larger diameter bore portion 77*e*, and a flange 159 at the interface of the smaller and larger diameter portions. Sealing material 56 (e.g., packing material) is positioned in the bore between the bore shoulder 156 and the nozzle flange 159. The replacement nozzle 71*e* is tightened to the bore (using the wrenching flats 59) to compressively mechanically and structurally attach the replacement nozzle 71*e* to the vessel 20. Also, tightening the replacement nozzle 71*e* in the bore compresses the sealing material 56 between the bore shoulder 159 and the nozzle flange 157 to mechanically seal the replacement nozzle 71*e* to the vessel. Another mechanical seal may be provided in the bore between the interior end 73*e* of the replacement nozzle 71*e* and the end 162 of the nozzle stub 152 by sealing material 56 (e.g., gasket or packing material) which also is compressed by tightening the nozzle to the bore. Where a mechanical seal is provided between the annular edges of adjacent nozzle sections, such as the end 162 of nozzle stub 152 and the interior end 73*e* of replacement nozzle 71*e*, the edge is chambered at 163 for the new and existing nozzle (not shown) to cause the seal to compress radially into the nozzle and prevent the packing material from extruding through the gapped region between the two nozzles. Achieving the seal between nozzle stub 152 and replacement nozzle 71*e* requires some axial loading on the existing nozzle stub 152. Alternatively, a gap may be left between the replacement nozzle 71 and the existing nozzle stub 152 so that the existing nozzle stub 152 is not subjected to any axial or radial loading which might otherwise stress the J-groove weld 34. The length of tubular section 158 is selected so that some thread is available in the vessel bore after initial installation to further tighten the nozzle into the bore during service to compensate for shrinkage of the sealing material 56. The bore and nozzle or external compression sleeve are similarly threaded in FIGS. 3, 9, 10, 11, 12–24. The mechanical seals formed at bore shoulder 156 and the nozzle flange 159, and at the end 162 of nozzle stub 152 and the interior end 73*e* of replacement nozzle 71*e* are adjustably-loaded, i.e., the degree of compression of the respective sealing material 56 may be adjusted during service, for example, to compensate for seal shrinkage. In most the embodiments disclosed herein, the mechanical seals are similarly adjustably-loaded, and specific reference thereto will not be made in each embodiment.

The partial nozzle replacement assembly 170 depicted in FIG. 9 differs from the partial nozzle replacement assembly 150 in FIG. 8 in that the replacement nozzle 7 lf of FIG. 9 seals with the existing nozzle stub 152 around the circumference thereof without axially loading the nozzle stub 152. In this embodiment, the bore 30 from a point overlapping the end 162 of the nozzle stub 152 to the exterior of the vessel is enlarged in diameter to define the enlarged diameter portion 77*f* and a shoulder 156 in the portion of the enlarged bore overlapping the end 162 of the nozzle stud 152. The enlarged diameter bore portion 77*f* is threaded adjacent the exterior of the vessel. The replacement nozzle 71*f* is sized to be received in the larger diameter bore portion 77*f* and includes a threaded portion 76*f* threadedly received in the threaded portion of larger diameter bore portion 77*f* The ID of the replacement nozzle 71*f* at the interior end 174 thereof is enlarged to receive therein the end 162 of the nozzle stub 152. Sealing material 56 (e.g., packing or gland material) is positioned between the bore shoulder 156 and the end 174 of the replacement nozzle 71*f* surrounding the end of the nozzle stub 152. The replacement nozzle 71*f* is tightened to the bore to compressively, mechanically and structurally attach the replacement nozzle 71*f* to the vessel 20. Also, tightening the replacement nozzle 71*f* in the bore compresses the sealing material 56 against the shoulder 156 and against the outer circumference of the end 162 of the nozzle stub 152 to mechanically seal the replacement nozzle 71*f* to the vessel. Sealing material 56 (e.g. gasket material) may also be compressed between the end 162 of the existing nozzle stub 152 and shoulder 175 where the nozzle ID changes diameter however, this would axially load the nozzle stub.

The partial nozzle replacement assembly 180 depicted in FIG. 10 differs from the partial nozzle replacement assembly 150 in FIG. 8 in that the replacement nozzle 71*g* seals axially only with the end 162 of existing nozzle stub 152. The bore 30 is threaded adjacent the exterior of the vessel, but unlike the nozzle replacement assembly 150, the bore 30 extending from the end of the nozzle stub 152 to the exterior of the vessel is not enlarged in diameter, and no shoulder is formed in the bore sufficient to insert a seal. The replacement nozzle 71*g* is sized to be received in the bore 30 and includes a threaded portion 76*g* threadedly received in the threaded portion of the bore. Tightening the replacement nozzle 71*g* to the bore mechanically bolts and structurally attaches the replacement nozzle 71*g* to the vessel 20. A mechanical seal is provided in the bore between the interior end of the replacement nozzle 71*f* and the end 162 of the nozzle stub 152 by sealing material 56 (e.g. gasket material) which is compressed therebetween when the nozzle is tightened to the bore. The nozzle replacement 170 (FIG. 9) without the sealing material 56 between the end 162 of nozzle stub 152 and the shoulder 175 of the nozzle 71*f* is presently preferred over this embodiment and the embodiment of FIG. 8 because those embodiments axially load the existing nozzle stub 152.

The partial nozzle replacement assembly 185 depicted in FIG. 10A applies a sleeve 110*a* in the bore 30, as described for sleeve 110 of FIG. 7 to mechanically attach and seal the sleeve 110*a* in the bore 30. Additionally, sealing material 56 is compressed between the interior end of the sleeve 100*a* and the end of 162 of the nozzle stub 152 when the sleeve 110*a* is attached by hydraulically or other means forcing the nozzle into the vessel.

FIG. 11 shows another variation of the full replacement nozzle 71 of FIG. 4 for a partial nozzle replacement assembly 190 that includes an existing nozzle stub 152 adjacent the interior of the vessel 20 and a replacement nozzle 71*h*. In this embodiment, the bore 60 from which the existing nozzle has been removed is enlarged in three sections. The bore is tapered in a first section 74*h* immediately adjacent the nozzle stub 152, increasing in diameter as the bore progresses towards the exterior of the vessel. In a second section 182 adjacent the tapered first section 74*h*, the bore is cylindrical having the largest diameter of the tapered section 74*h*. In a third section 77*h*, the bore has a diameter further enlarged from that of bore section 182 and is threaded. A shoulder 156 is formed in the bore 60 at the interface of the two larger diameter sections 182, 77*h*. The replacement nozzle 71*h* likewise includes a tapered portion 72*h* sized to be received in the tapered section 74*h* of the bore, a smaller cylindrical portion 184 sized to be received in the cylindrical section 182 of the bore, and a threaded larger diameter portion 76*h* sized to be threadedly received in the threaded larger diameter section 77*h*. The replacement nozzle 71*h* is structurally attached to the vessel 20 by tightening the nozzle into the bore, which forces the tapered portion 72*h* of the nozzle into mechanical engagement with the tapered section 74*h* of the bore to mechanically bolt the replacement nozzle 71*h* to the vessel 20. A mechanical seal is obtained between the contacting surfaces of the tapered nozzle portion 72*h* and the tapered bore section 74*h* by engagement of the two surfaces, as described above and in the prior application. A gap 186 is left between the end 162 of the nozzle stub 152 and the interior end of the replacement nozzle 71*h*. However, another mechanical seal may be provided in gap 186 as shown in FIG. 12 (described below).

The partial nozzle replacement assembly 190*a* shown in FIG. 12 is identical to partial nozzle replacement assembly 190 except that no gap is left between the tapered nozzle portion 72*h* and the end 162 of the nozzle stub 152, and sealing material 56 (e.g., gasket or packing material) is positioned thereat and compressed when the replacement nozzle 71*i* is tightened to the bore to form another mechanical seal within the bore.

In the embodiments of FIGS. 10, 11, and 12, a shoulder similar to shoulder 156 in FIG. 8 may be provided in the gap region 188 in the bore, and a flange may be provided on the nozzle similar to flange 159 in FIG. 8, and another mechanical seal may be provided in this gap, as shown in FIG. 8. (This additional mechanical seal may also be provided in the embodiments of FIGS. 13, 14, 15 and 16.)

FIGS. 13–16 respectively illustrate full nozzle replacement assemblies 61*a*, 61*b*, 232 and 242 in which the existing nozzle has been completely removed. The nozzle replacement assemblies 61*a*, 61*b* and 232 in the embodiments of FIGS. 1315, respectively, employ full nozzles which extend to the interior of the vessel while the replacement nozzle assembly 242 in the embodiment of FIG. 16 employs a partial nozzle that terminates within the bore of the vessel sealed with respect to a shrink fit sleeve 244 that extends to the interior of the vessel and packing material 56. The full nozzle replacement assemblies 61*a*, 61*b*, 232 and 242 all utilize a nozzle assembly of at least two parts excluding the seals themselves which includes a drive or compression sleeve threaded to the bore of the vessel like the nozzle assembly 61 shown in FIG. 3.

Referring to FIGS. 13–16, the procedure for the installing full nozzle replacement assemblies 61*a*, 61*b*, 232 and 242 removes the existing nozzle entirely, and the vessel bore is altered to provide tapered and/or larger diameter sections, and/or threads in the bore adjacent the exterior of the vessel.

Figure 13:
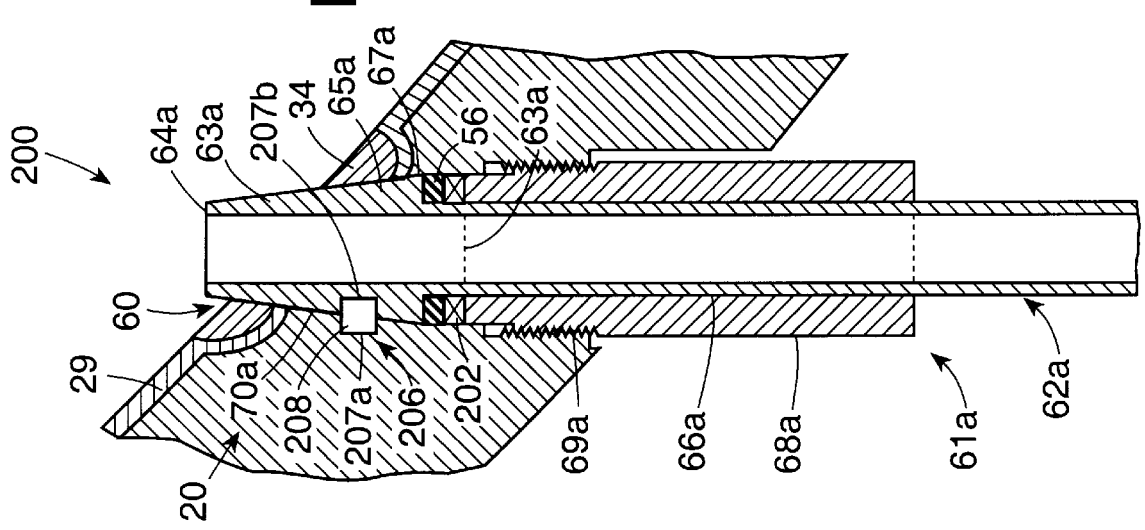
FIG. 13 is a section view similar to that of FIG. 3 depicting a full nozzle replacement assembly which incorporates a feature or features of the embodiment of FIG. 3 and an anti-rotation device.

Full nozzle replacement assembly 61*a* depicted in FIG. 13, like the nozzle assembly 61 of FIG. 3, employs a compressive loading system for mechanically attaching the nozzle to vessel 20, and includes a nozzle body 62*a* having a tapered portion 63*a* having a smaller diameter end 64*a* projecting from the interior entrance of the bore 60 in the vessel 20 and a larger diameter end 65*a* within bore 60. The nozzle body 62*a* also includes a tubular portion 66*a* projecting from the exterior of the vessel 20. The diameter of the tubular portion 66*a* is smaller than the larger diameter end 65*a* of the tapered portion 63*a*, and a flange 67*a* is formed where the diameter of the nozzle changes from the smaller to larger diameter. The nozzle replacement assembly 61*a* also includes an externally threaded cylindrical drive sleeve 68*a*, and the bore 60, includes a threaded cylindrical portion 69*a* and a tapered portion 70*a*. Tightening the sleeve 68*a* (using wrenching flats thereof, not shown) into the threaded bore portion 69*a* against the flange 67*a* of the nozzle body forces the tapered portion 63*a* of the nozzle body into compressive mechanical engagement with the tapered portion 70*a* of the bore 60 to mechanically attach the nozzle body 62*a* to the vessel 20. A mechanical seal is obtained between the contacting surfaces of the tapered nozzle portion 63*a* and the tapered bore portion 70*a* by engagement of the two surfaces, as described above.

Sleeve 68*a* is tightened sufficiently to ensure that the seal is obtained.

The full nozzle replacement assembly 61*a* described so far with respect to FIG. 13 is basically the same as for the full nozzle assembly 61 of FIG. 3, except for the lengths of the tapers in the nozzle body 62*a* and the bore 60*a* the length of the taper in the bore and nozzle may vary from embodiment to embodiment. For example, the taper may be less than ½" in length. In addition, nozzle replacement assembly 61*a* provides packing material for a secondary seal at the interface of the tapered and cylindrical sections of the bore (i.e., at the flange 67*a* of the nozzle), and includes an anti-rotation device 206 described in detail below. Still referring to FIG. 13, a thrust bearing 202 is positioned between the flange 67*a* of the nozzle body 62*a* and the interior end of the nozzle drive sleeve 68*a*, which facilitates tightening the sleeve 68*a* in the bore 60*a*. Sealing material 56 (e.g., packing or gland material) is also positioned between the thrust bearing 202 and the interior end of the drive sleeve 68*a*.

The anti-rotation device 206 is implemented in the full nozzle replacement assembly 61*a* of FIG. 13 as an optional feature by an axial slot defined by adjacent slot portions 207*a*, 207*b* in the bore 60 and in the tapered portion 63*a* of the nozzle body 62*a*, respectively, and key stock 208 projecting into engagement with both the axial slot portions 207*a*, and 207*b* in the bore and the nozzle.

Figure 14:
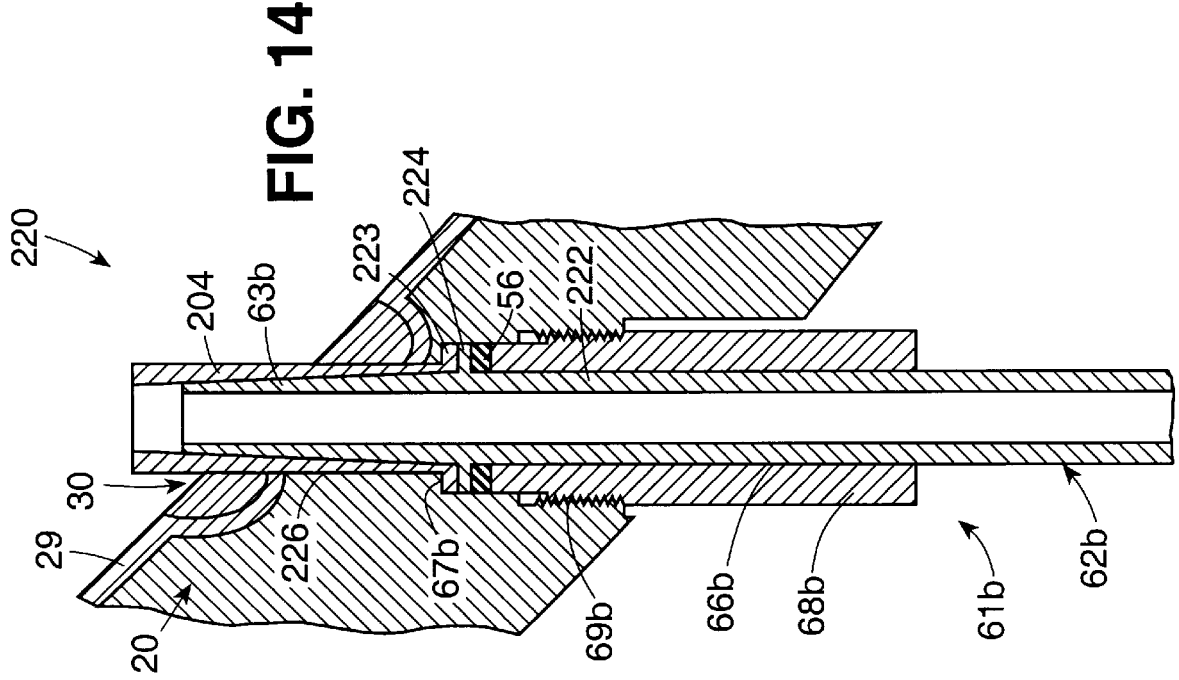
FIG. 14 is a section view similar to that of FIG. 9 depicting a full nozzle replacement assembly which incorporates features from the embodiments of FIGS. 3 and 13.

The full nozzle replacement assembly 61*b* shown in FIG. 14, like the full nozzle replacement assembly 61*a* of FIG. 13, is compressively mechanically attached to the vessel and utilizes a tapered bore/tapered nozzle, but does so without actually tapering the vessel bore. Full nozzle replacement assembly 61*b* similar to nozzle assembly 61*a* of FIG. 13, includes a nozzle body 62*b* and a threaded drive sleeve 68*b*. The nozzle body 62*b* includes a tapered portion 63*b*, a cylindrical portion 222 and a flange 224 at the interface of the cylindrical and tapered portions of the nozzle body. The bore 30 for full nozzle replacement assembly 220 does not include a tapered portion, and instead includes a smaller diameter cylindrical portion 226 and a larger diameter cylindrical portion 69*b*, which form a shoulder 67*b* at the interface thereof. Instead of a tapered bore section, a sleeve 204 having a cylindrical OD and a tapered ID is positioned in the smaller diameter bore section 226 sized to engage the tapered nozzle portion 63*b* when the drive sleeve 68*b* is tightened to the bore. The sleeve 204 has a flanged interior end 223 which engages the flange 67b in the bore to initially hold and position the sleeve 204 in the bore. Sealing material 56 (e.g., packing or gland material) is positioned between the nozzle flange 224 and the interior end of the drive sleeve 68b which is compressed when the drive sleeve is tightened to the bore. Tightening the drive sleeve 68b to the bore compressively loads the nozzle body 62b to the vessel. Full nozzle replacement assembly 61b provides a seal at the interface of the different diameter sections of the bore 226, in addition to the mechanical seal between the tapered surfaces of the nozzle and the sleeve 204.

Figure 16:
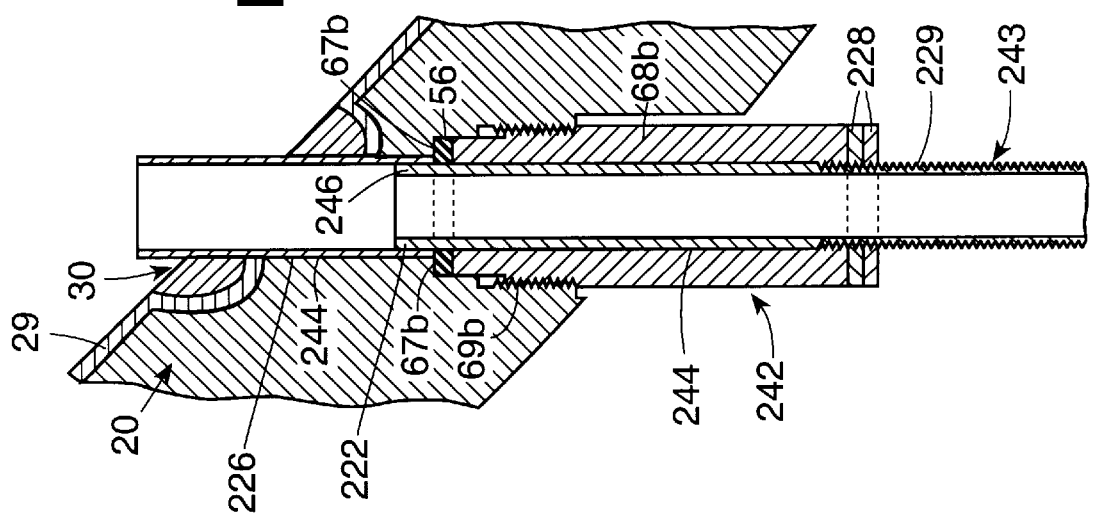
FIG. 16 is a section view similar to that of FIG. 3 depicting a full nozzle replacement assembly which incorporates a feature or features from the embodiments of FIGS. 3, 7 and 15.

Alternatively, as shown in FIG. 16, the flange 224 on the nozzle body 62b may be omitted, the tubular section 222 of the nozzle body adjacent the exterior end of the drive sleeve 68b may be threaded along with drive sleeve 68b, to mechanically attach the nozzle body to the vessel and compress the sealing material 56 between the end of the drive sleeve and the flanged portion 223 of the sleeve 204, and lock nuts may be tightened against the drive sleeve to prevent the drive sleeve from loosening in the event the vessel or nozzle experiences vibration due to fluid-induced vibration or some other mechanism. As discussed above full nozzle replacement assembly 61b provides a seal at the interface of the different diameter sections of the bore, in addition to the mechanical seal between the tapered surfaces of the nozzle and the sleeve 204. This arrangement allows separate loadings for the two sealing surfaces, and can be applied to other embodiments as well.

Figure 15:
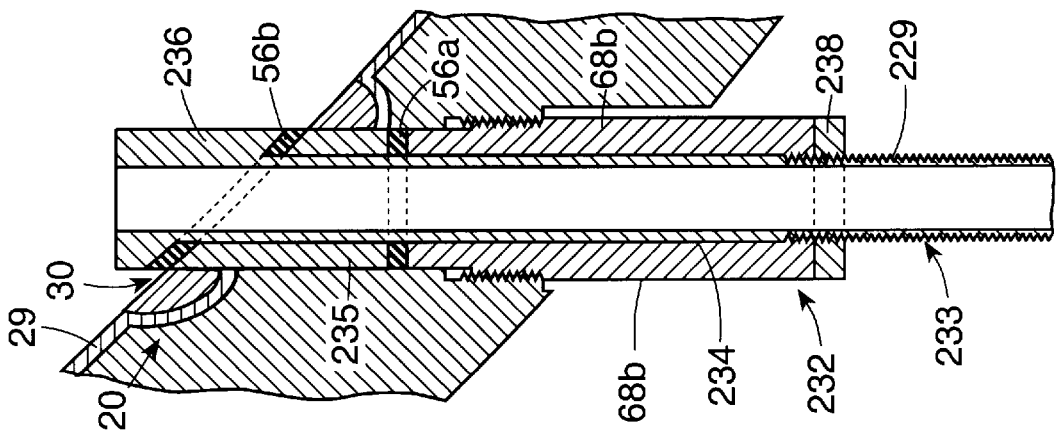
FIG. 15 is section view similar to that of FIG. 14 depicting a full nozzle replacement assembly which incorporates a feature or feature of the embodiment of FIG. 14 and clamps the replacement nozzle to the vessel to form a seal at the cladding on the interior of the vessel.

Referring to FIG. 15, full nozzle replacement assembly 232 employs a cylindrical bore 30 threaded adjacent the exterior of the vessel 20 and a full replacement nozzle that is mechanically attached to the vessel 20 by a drive or attaching sleeve 68b threaded to the vessel. Full nozzle replacement assembly 232 includes a nozzle body 233, and the drive sleeve 68b and a seal alignment spacer sleeve 235. The nozzle body 233 has tubular section 234 ending in a flanged end 236 projecting into the interior of the vessel 20. Spacer sleeve 235 and the end 236 of the nozzle body in the interior of the vessel are flanged at the angle of the ID of the vessel. Drive sleeve 68b, is threaded adjacent its exterior end and is sized to be threadedly received in the threaded portion of the bore 30 structurally attaching the sleeve and nozzle assemble to the vessel. The spacer sleeve 235 is positioned in the bore between the drive sleeve 68b and the flanged end 236 of the nozzle body 233. Sealing 56a (e.g., a first packing seal ring or gland is positioned between sleeves 68b and 235 and sealing material 56b (e.g., a second packing seal ring or gland) is positioned between sleeve 235 and the flanged end 236 of the nozzle body 233. The nozzle body 233 is positioned in the bore 60a, followed by sealing material 56b, the inner sleeve 235 and sealing material 56a. The drive sleeve 68b is threaded to the bore 30, and a nut 238 is tightened to a threaded section 229 of the tubular section 234 of the nozzle body 233 to mechanically compress sealing materials 56a and 56.

Referring to FIG. 16, full nozzle replacement assembly 242 (referred to as a full nozzle since all of the existing nozzle is removed) employs a bore 30 similar to the one shown in FIG. 14, which includes a cylindrical section 226 of smaller diameter opening to the vessel interior and a cylindrical section 60b of larger diameter opening to the exterior of the vessel which is threaded adjacent the opening to the exterior of the vessel. The cylindrical bore sections 222 and 60b of different diameter form a shoulder 67b within the bore at the interface of the two sections. The full nozzle replacement assembly 242 includes a nozzle body 243 having a tubular section 222 and a drive sleeve 68b. The tubular section 222 terminates within the smaller diameter section 226 of the bore and projections therefrom in an exteriorly threaded section 229. The drive sleeve 68b is exteriorly threaded adjacent the interior end of the sleeve and sized to be threadedly received in bore section 60b. The drive sleeve 68b is interiorly threaded adjacent the end projecting from the vessel. The full nozzle replacement assembly 242 also includes a sleeve 244 shrink fitted to the cylindrical nozzle section 222 and extending to the shoulder 67b in the bore as described above in connection with nozzle 110 in FIG. 7, with the end 246 of the nozzle body 243 received in the end of the sleeve 244. Sealing material 56 (e.g., a packing seal ring or gland) is positioned in the bore between the shoulder 67b and the flange 204 of the nozzle body. After the sleeve 244 has been shrink fitted to the bore 30, the sealing material 56 is positioned at flange surface 67b and the drive sleeve 68b is tightened to the bore to compress the sealing material 56. The threaded section 229 of the nozzle body 243 is threaded to the drive sleeve 68b to structurally attach the nozzle body 243 to drive sleeve 68b which is structurally attached to the vessel with threads 69b. The locking nuts 228 prevent the nozzle from loosening.

In the embodiments depicted in FIGS. 3–4, 6–16 and 21, mechanical seals are provided solely within the bore. In FIGS. 5, 17–20, and 22–25, mechanical seals are or may be provided also at the vessel OD.

FIG. 17 shows a full nozzle replacement assembly 250 which is a variation of the full nozzle replacement assembly 61b shown in FIG. 14 and incorporates an anti-rotation device and two leak paths features. The function of the leak paths is to channel any reactor coolant leakage which may occur through a corrosion resistant leak path out past the exterior surface of the vessel in a visible manner, e.g., to the oxygenated environment where the coolant can flash steam without eroding the vessel. Like full nozzle replacement assembly 220 of FIG. 14, the bore 30 of full nozzle replacement assembly 250 includes a smaller diameter cylindrical portion 226 and a larger diameter cylindrical portion 69b, which form a shoulder 65b at the interface thereof. The full nozzle replacement assembly 250 is similar to that of nozzle assembly 61b of FIG. 14 in that nozzle assembly 250 includes a nozzle body 62b and a threaded drive sleeve 68b, with the nozzle body 62b including a tapered portion 63b, a cylindrical portion 222 and a flange 224 at the interface of the cylindrical and tapered portions of the nozzle body. As in the full nozzle replacement assembly 61b of FIG. 14, instead of a tapered bore section, the full nozzle replacement assembly 250 includes a sleeve 204 having a cylindrical OD and a tapered ID positioned in the smaller diameter bore section 226 sized to engage the tapered nozzle portion 63b when the drive sleeve 68b is tightened to the bore. Full nozzle replacement assembly 250 (FIG. 17) includes the following additional elements: a first anti-rotation device 255 for preventing rotation of the sleeve 204 in the bore; a second anti-rotation device 258 for preventing rotation of the nozzle body 62b in the bore, circumferential vapor collection groove 282, first packing seal ring or gland 56a, flat washer 260, Belville washer 262; lantern ring 264; two concentric packing seal rings or glands 56b, c; axial vapor channel slot 280, gasket 56; channeling sleeve 268; channeling passages 270, and jam nut 271. Full nozzle replacement assembly 250 provides a primary seal at the tapered sections 226, 63b of the sleeve 204 and the nozzle body 62b, a secondary seal at the packing seal ring 56a, and a tertiary seal at the packing seal rings 56b, c.

The anti-rotation device 255 (FIG. 17) comprises registered slot portions 271a, b, in the vessel and the flange 223 of the sleeve 204 and a key stock 208 in the registered slot portions. The anti-rotation device 255 prevents the sleeve 226 from rotating relative to the bore. The anti-rotation device 258 comprises registered slot portions 271a, b in the sleeve flange 223 and on the nozzle body flange 224, and a cylindrical key stock 208 in the registered slot portions 271a, b. The anti-rotation device 258 prevents the nozzle body 62b from rotating relative to the sleeve 204, and thereby from rotating relative to the vessel 20. The slots 271a, b and the key stock 208 for anti-rotation devices 255 and 258 may be of circular or rectangular cross-section. The flat washer 260 and the Belville washer 262 assist in securely compressively loading the nozzle body 62b in the bore, and line-load the seals.

As mentioned, the packing seal ring 56a provides a secondary seal to prevent leakage. The packing seal rings 56b, c. provide a tertiary seal forming a primary leak path with the inclusion of lantern ring 264 that axially projects between the concentric packing seal rings 56b, c and includes a series of passages 265 spaced circumferentially about the lantern ring extending axially therethrough from one end to the other. The passages 265 are positioned to extend between the spaced concentric packing seal rings 56b, c into circumferential groove 276 where the coolant collects and passes through a series of passages 270 spaced circumferentially (i.e., each having a circumferential width of substantially less than 360 degrees) extending axially from one end to the other of drive sleeve 68b and allows the coolant to escape to the atmosphere. The finction of the slot 268 in the lantern ring 264 is to collect any fluid which may leak past an assumed failed seal at the tapered nozzle body 63b and the tapered sleeve 226 interface or the bore to tapered sleeve 226 interface and the secondary packing seal ring 56a, and to channel the leaked fluid to the axial passages 265 in the lantern ring 264. Grooves 269 perpendicularly intersecting circumferential grooves 268 channel the leaked fluid to the circumferential grooves 268. The function of the slot 276 in the sleeve end 272 is to collect any fluid which passes through the passages 265 in the lantern ring 264 and to channel that fluid to the axial passages 270 in the sleeve 68b. Thus, the primary leak path directs any fluid passing between the tapered nozzle body portion 63b and the sleeve 204, and/or between the sleeve 204 and the bore, which also leaks past a failed secondary packing seal ring 56a, to the passages 265 in the lantern ring 264 and the passages 270 in the sleeve 68b, from which the leaking fluid is discharged at the end 274 of the drive sleeve 68b outside of the vessel. Although not shown, the lantern ring 264, packing seal ring 56c, and sleeve 274 could easily be modified to channel the primary leak path between sleeve 274 and nozzle body 62b. The groove 276 is of sufficient depth to allow additional compression by tightening sleeve 68b should the seal shrink with time.

Elements defining the secondary leak path include: an axial slot 280 in drive sleeve 68b which the channeling sleeve 268 overlays; and a radial groove 282 extending 360° in the circumference of the drive sleeve 68b closed by the channeling sleeve 268. The radial groove 282 starts in the axial channel 280 and extends in the drive sleeve 68b past the channeling sleeve 268 where it opens to the outside of the vessel. Gasket 56 prevents in leakage on to the vessel. Thus, the secondary leak path directs any fluid passing between the tapered nozzle body portion 63b and the sleeve 204, and/or between the sleeve 204 and the bore, which also leaks past a failed first packing seal ring 56a and a failed second packing seal ring 56b and/or c to the radial channel 282, which then directs the fluid to axial groove 280 from which the leaking fluid is discharged outside of the vessel in a corrosion resistant means such that leakage will not erode the vessel.

Figure 18:
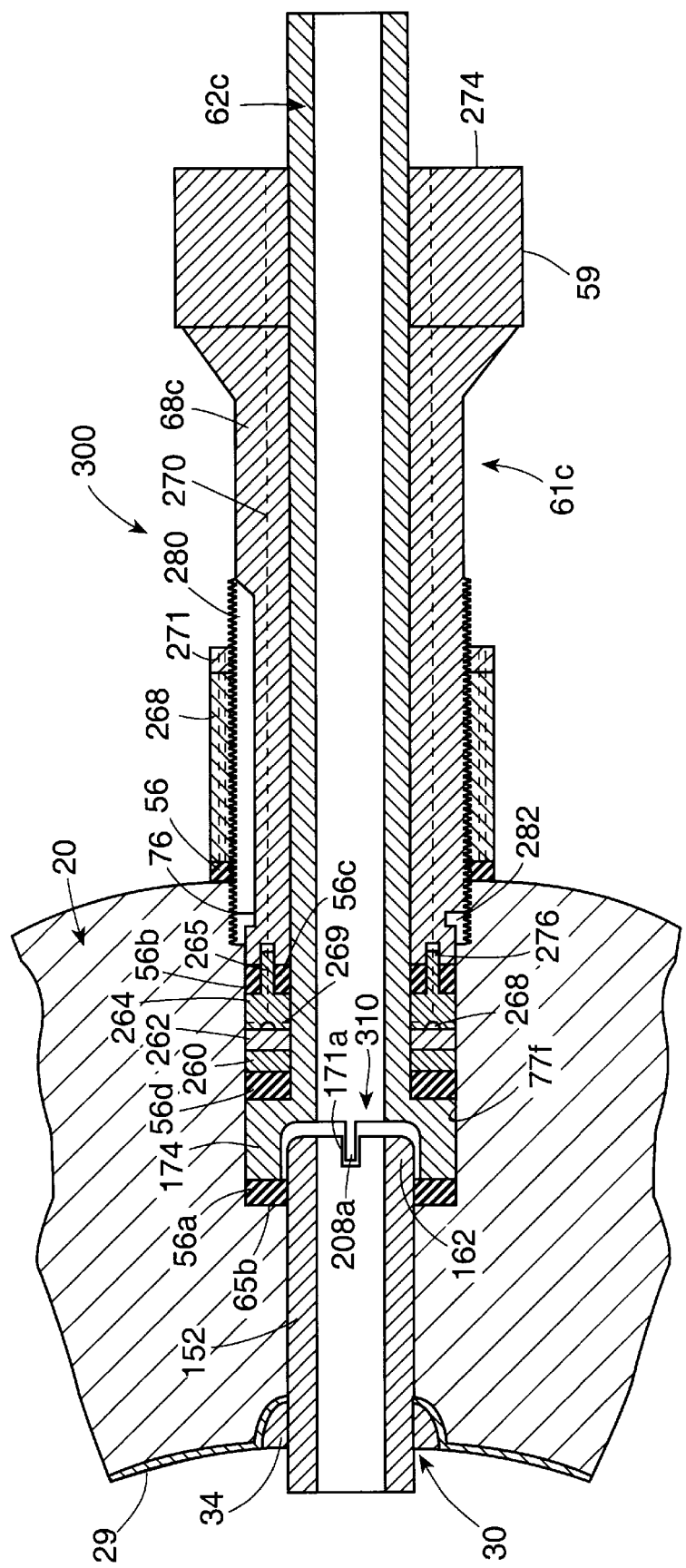
FIG. 18 is a section view similar to that of FIG. 17 depicting a partial nozzle replacement assembly in which part of the original nozzle is not removed and which incorporates a feature or features from the embodiments of FIGS. 9 and 17 with another embodiment of an anti-rotation device.

FIG. 18 shows a partial nozzle replacement assembly 300 which is a variation of the full nozzle replacement assembly 250 of FIG. 17, and which incorporates a feature or features from the partial nozzle replacement assembly 170 of FIG. 9, to provide a partial nozzle replacement assembly that includes an existing nozzle stub 152 adjacent the interior of the vessel 20. In this embodiment, like nozzle replacement assembly 170 (FIG. 9), a portion of the existing nozzle is removed leaving the nozzle stub 152 extending into the bore from the interior of the vessel. Both the nozzle stub 152 and its J-groove weld 34 are left in tact and substantially undisturbed. The entire portion 77f of the bore 30 extending from the end of the nozzle stub 152 to the exterior of the vessel is enlarged in diameter, including a portion 174 overlapping the end 162 of the nozzle stub 152. A shoulder 65b is formed in the interface of the smaller and larger diameter portions. The enlarged diameter bore portion 77f is threaded adjacent the exterior of the vessel. The replacement nozzle assembly 300 includes a nozzle body 62c and a drive sleeve 68c, similar to nozzle replacement assembly 250 of FIG. 17. However, the nozzle body 62c is configured like the one piece nozzle 71f of FIG. 9 in that it overlaps the existing nozzle stub 152. The ID of the replacement nozzle body 62c at the interior end 174 thereof is enlarged to receive therein the end 162 of the nozzle stub 152, as in replacement nozzle 170 of FIG. 9. A packing seal ring 56a is positioned between the bore shoulder 67b and the end 174 of the nozzle body 62c, surrounding the end 162 of the nozzle stub 152, and another packing seal ring 56d is applied at the flanged end 174 of the nozzle body 62c. The anti-rotation device 310 of the partial nozzle replacement assembly 300, which differs from the anti-rotation devices of full nozzle replacement assembly 250, includes an axial slot 171a in the existing nozzle stub 152 and a tab 208a machined into the nozzle body 62c and radially projecting therefrom into the slot 171a. If tortional loads are high a plurality of axial slots and tabs can be used.

Alternatively, the anti-rotation device 310 may be formed by axial groove portion, circular or tapered in nature, in the existing nozzle stub 152 and a similar groove in nozzle body 62c into which the key stock is inserted and held (several grooves and key stocks could be used if tortional loads demanded such). The nozzle groove is of sufficient length to allow further compression loading from time to time The nozzle replacement assembly 300 is otherwise as described for nozzle replacement assembly 250 depicted in FIG. 17, and includes the primary and secondary leak paths as described for nozzle replacement assembly 250.

Figure 19:
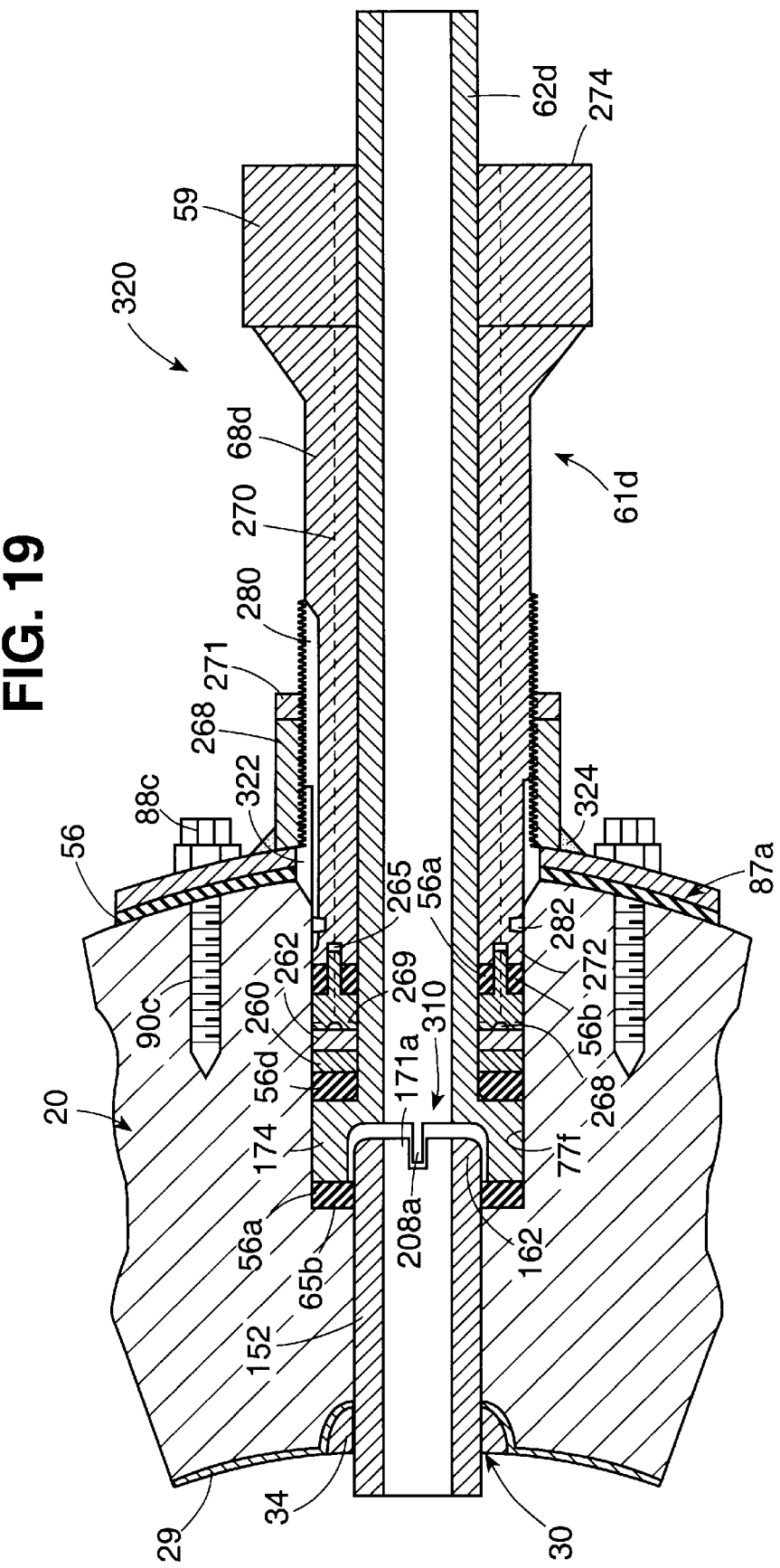
FIG. 19 is a section view similar to that of FIG. 18 depicting another embodiment of a partial nozzle replacement assembly in which part of the original nozzle is not removed and which incorporates a feature or features of the embodiments of FIGS. 5 and 18.

FIG. 19 depicts a partial nozzle replacement assembly 320 similar to the partial nozzle replacement assembly 300 shown in FIG. 18, but which bolts the nozzle sleeve 68d to the vessel exterior with a flange 87a similar to the one used to bolt nozzle assembly 71c to the vessel as shown in FIG. 5. The nozzle body 62d is inserted into the bore, and the flange 87a along with channeling sleeve 268 (fabricated and fillet welded 324 to flange) is sealed against an annular taper guide 322 and the vessel OD by sealing (e.g., gasket) material 56, and bolted to the vessel exterior with threaded bolts 88c in threaded holes 90c in the vessel. Taper guide 322 provides alignment of the nozzle to the vessel such that the nozzle may be compressed into the vessel to form a tight interference fit to resist external bending loads that may be applied to the nozzle. (Though not shown for the other embodiments this may be applied to all of the embodiments in this application.) The drive sleeve 68*d* is then tightened to channeling sleeve 268 to compressively load the nozzle body 62*d* to the vessel. The jam nut 271 is then tightened to prevent the drive sleeve 68*d* from loosening. This embodiment also provides the same primary and secondary leak paths and anti-rotation device as in the partial nozzle replacement assembly 300, and is otherwise the same as the partial nozzle replacement assembly 300.

Figure 6:
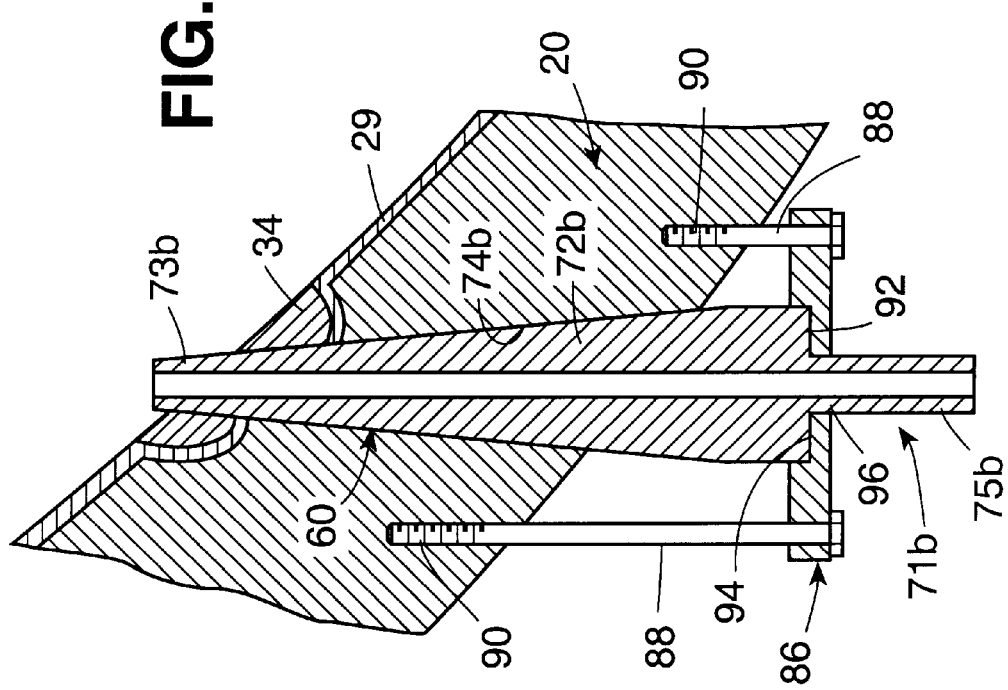
Figure 20:
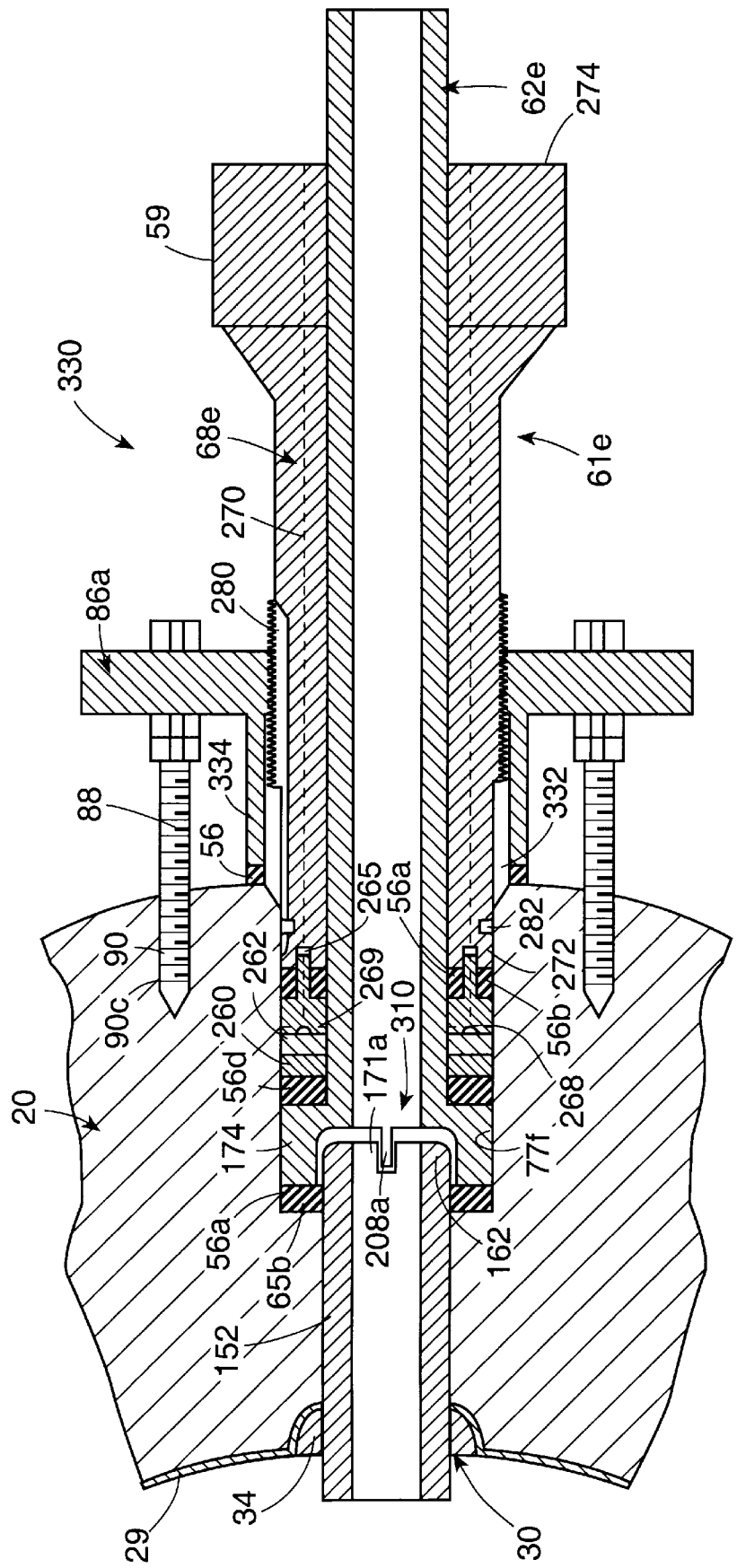
FIG. 20 is a section view similar to that of FIG. 18 depicting still another embodiment of a partial nozzle replacement assembly in which part of the original nozzle is not removed and which incorporates a feature or features of the embodiments of FIGS. 5 and 18.

FIG. 20 depicts a partial nozzle replacement assembly 330 also similar to the partial nozzle replacement assembly 300 shown in FIG. 18, but which bolts the drive sleeve 68*e* to the vessel exterior with an external flange 86*a* similar to the one used to bolt nozzle assembly 71*b* to the vessel as shown in FIG. 6. Exterior flange 86*a* is a separate piece from drive sleeve 68*e* (or in an alternate embodiment may be one-piece with the drive sleeve), and is threaded to the drive sleeve 68*e*. The external flange 86*a* is bolted to the vessel exterior by threaded bolts 88 in threaded holes 90 with the sealing (e.g., gasket) material 56 surrounding the taper guide 332 compressed between the end of a sleeve portion 334 of the flange 86*a* and the exterior of the vessel. Flange 86*a* is bolted on in this manner such that it does not have to conform to the curvature of the vessel as does flange 87*a* of FIG. 19 which can be difficult for heater nozzles inserted on the hillside of the spherical shaped head at the bottom of the pressurizer vessel The drive sleeve 68*e* is threaded to the flange 86*a* to compress the packing seal rings 56*a–d*. This embodiment is otherwise like the partial nozzle replacement assembly 300 (FIG. 18) and provides the same primary and secondary leak paths and anti-rotation device.

Although only a single key stock is shown for each anti-rotation device, depending on the tortional loads experienced by the nozzle, multiple key stocks could be used in combination.

In the embodiments described above, a structurally welded and seal welded nozzle may be full or partially removed by cutting or machining operations. As mentioned, the invention is also applicable to replacement of nozzles attached and sealed in other ways, (e.g., as described in the prior art discussed above and by mechanical attachment and sealing as described herein). A full or partial nozzle replacement, similar to a nozzle repair described below, may be of the precautionary type in which the existing nozzle has not failed in any way and the full or partial nozzle replacement by mechanical means is made for precautionary purposes. Typically, a precautionary replacement will also be made when the system is shut down for other reasons, such as scheduled refueling in a nuclear facility. Further, the invention is applicable to the repair of existing nozzles which do not require removal of the existing nozzle.

FIGS. 21–25 disclose repair embodiments which leave the existing nozzle within the bore in tact, and further attach the existing nozzle to the vessel and mechanically seal the existing nozzle to the vessel. A nozzle repair may be used in the event that the existing nozzle leaks or as a precaution in which the existing nozzle has not failed in any way and the mechanical sealing and further attachment of the nozzle to the vessel are made for precautionary purposes. In the embodiments of FIG. 21–25, the existing nozzle is mechanically sealed to the vessel, and may be further attached to the vessel by a fillet weld between the existing nozzle and a sleeve which is mechanically attached to the vessel. FIG. 26 provides a system applicable to the embodiments of FIGS. 21–25 which enables the drive sleeve to be torqued even after the fillet weld is applied to the existing nozzle. In the embodiments of FIGS. 21–24, the existing nozzle is cut off outside of the vessel to enable mechanical sealing to proceed, and in the embodiment of FIG. 25, the existing nozzle is left entirely in tact by use of a split seal and flange. FIGS. 21–25 apply to nozzle repair, features and techniques disclosed herein and in the prior application for full and/or partial nozzle replacement. Typically, a precautionary repair will be made when the system is shut down for other reasons, such as scheduled refueling in a nuclear facility.

Figure 21:
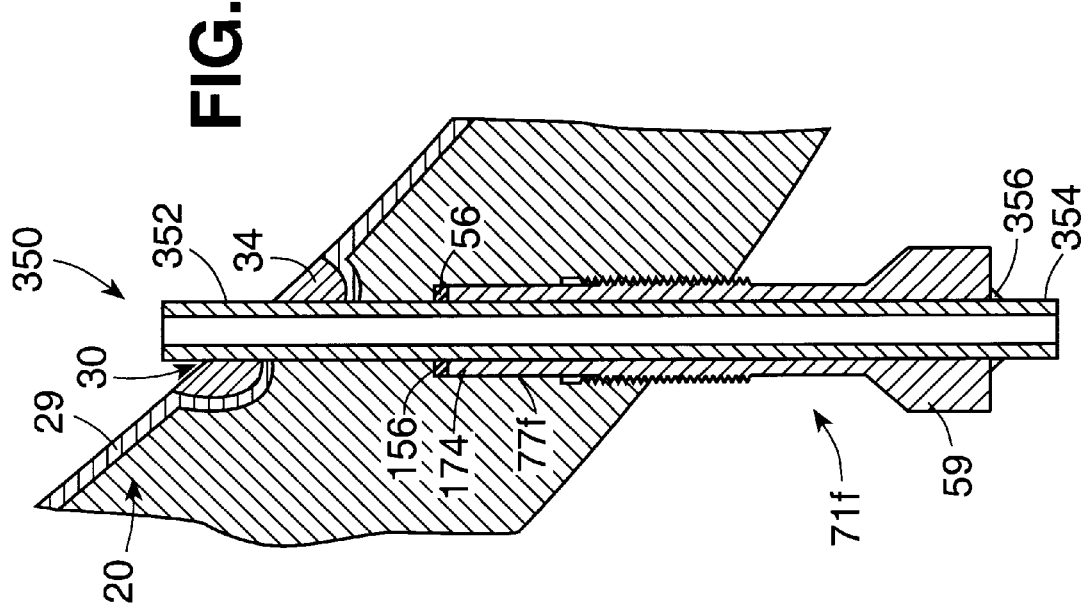
FIG. 21 is a sectional view similar to FIG. 9 depicting a repair assembly for an existing nozzle which incorporates a feature or features of FIG. 9.
Figure 26:
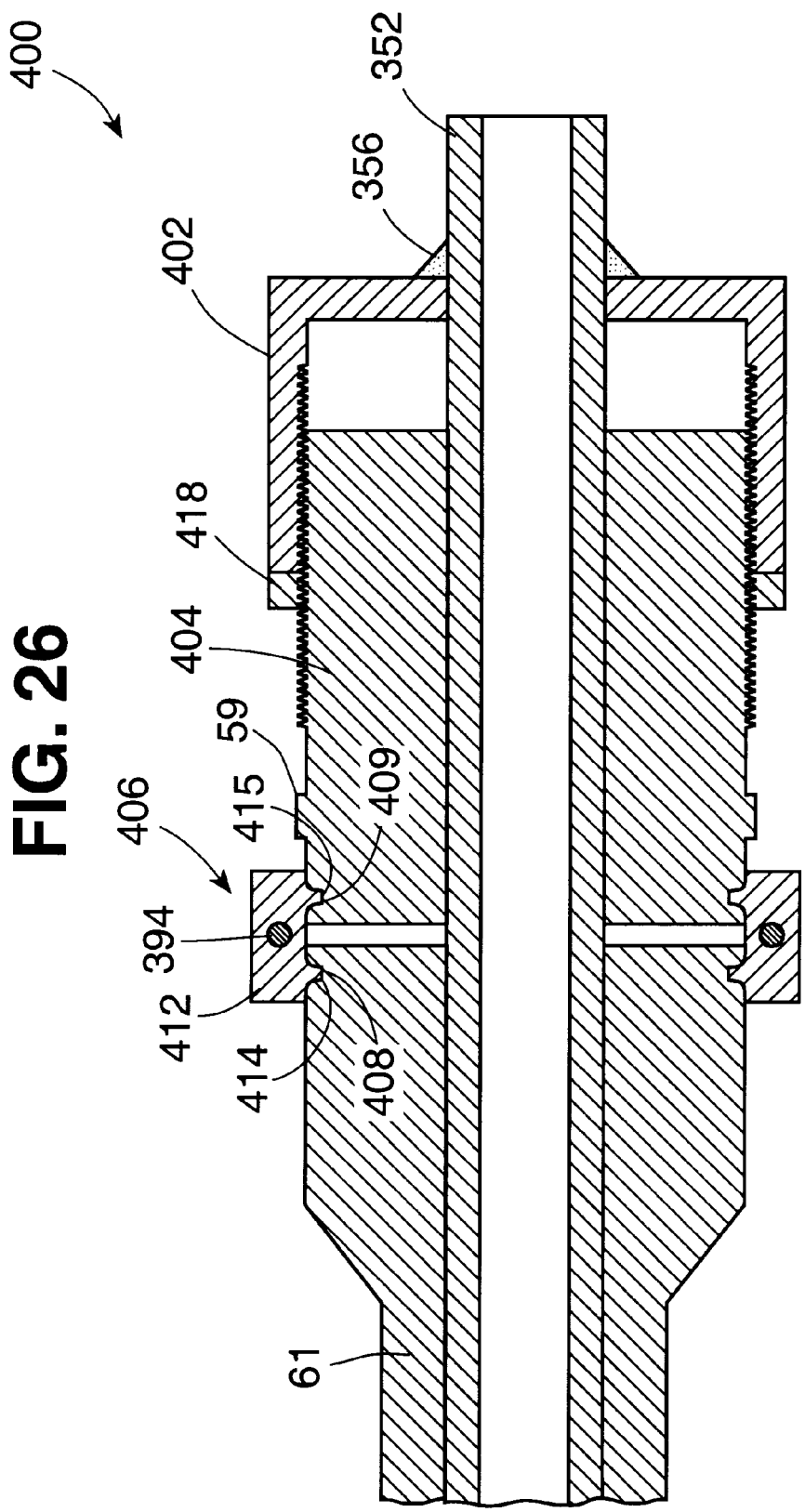
FIG. 26 is a sectional view similar to that of FIG. 22 depicting an assembly for a nozzle which incorporates the features of FIG. 22 including the option of welding the nozzle to a drive sleeve but which permits the drive sleeve to be adjusted relative to the vessel to tighten a mechanical seal after the repair assembly has been in service.
Figure 27:
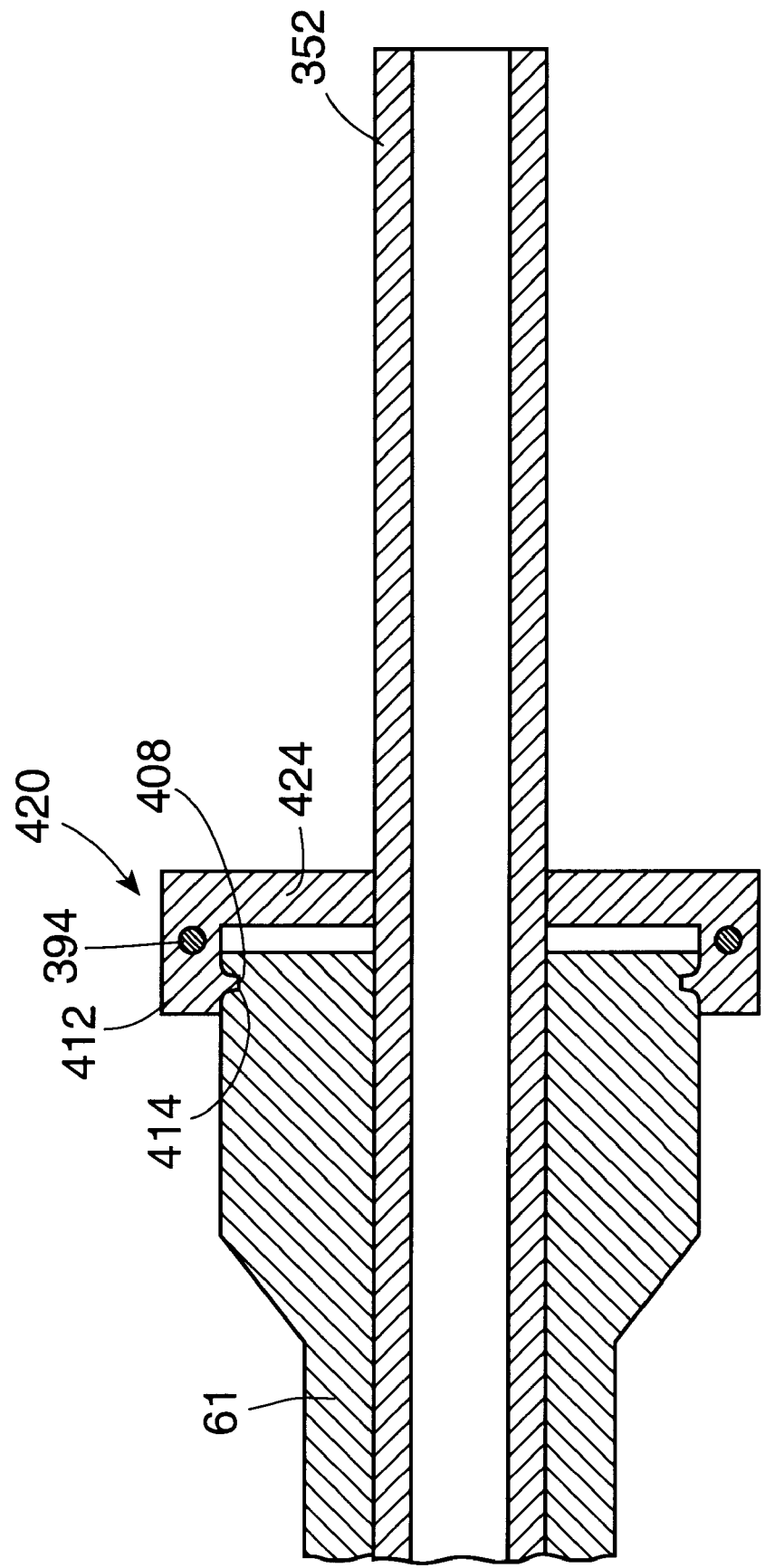
FIG. 27 is a section view similar to that of FIG. 26 depicting an assembly for a nozzle which incorporates a feature or features of FIGS. 25 and 26, allows installation without cutting the nozzle and without employing a weld as in FIG. 25; and allows a drive sleeve or flange to be tightened as in FIG. 26.

FIGS. 21–24 depict a nozzle repair assembly 350, 360, 370, and 380 in which an existing nozzle 352 is left entirely in tact within the bore 30 but is cut off at some point 354 outside of the vessel 20. nozzle repair assembly 350 of FIG. 21 applies a technique similar to the partial nozzle replacement assembly of FIG. 9 to nozzle repair. Referring to FIG. 21, the diameter of the bore 30 is enlarged starting at a point spaced in the bore from the J-groove weld 34 to provide an enlarged diameter bore section 77*f* as in FIG. 9. The bore section 77*f* is threaded adjacent the exterior of the vessel 20 and a sleeve 71*f* is threaded to the bore, as in FIG. 9. Sealing (e.g., packing) material 56 positioned between the interior end 174 of the sleeve 71*f* and the shoulder 156 formed where the larger diameter bore section 77*f* meets the smaller diameter bore 30, and is compressed when the sleeve is threaded to the bore to provide the mechanical attachment and the mechanical seal. The nozzle repair assembly 350 is the same as the partial nozzle replacement assembly of FIG. 9, except that the entire existing nozzle 352 is left within the bore and no changes are made to the existing nozzle (and bore). The existing nozzle 352 may be welded to the sleeve 71*f* with a fillet weld 356 to provide for further attachment of the nozzle 352 to the vessel 20, functioning as an anti-ejection device or the sleeve 71*f* may be modified and a clamping device 406 used as shown in FIGS. 26 and 27 (described below) to allow the sleeve to be torqued from time to time to compress the mechanical seal and prevent leakage.

Figure 22:
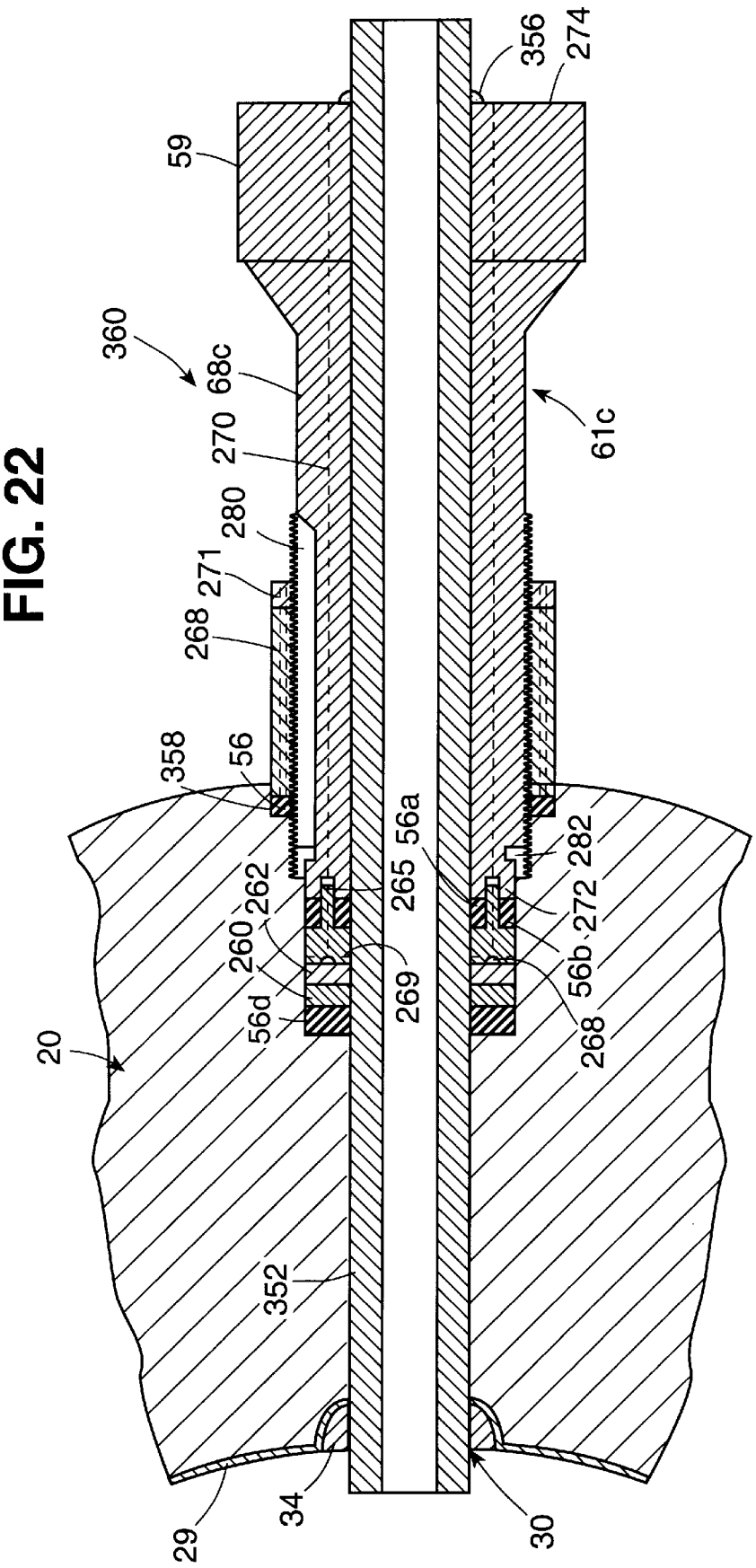
FIG. 22 is a sectional view similar to FIG. 18 depicting a repair assembly for an existing nozzle which incorporates a feature or features of FIG. 18.
Figure 23:
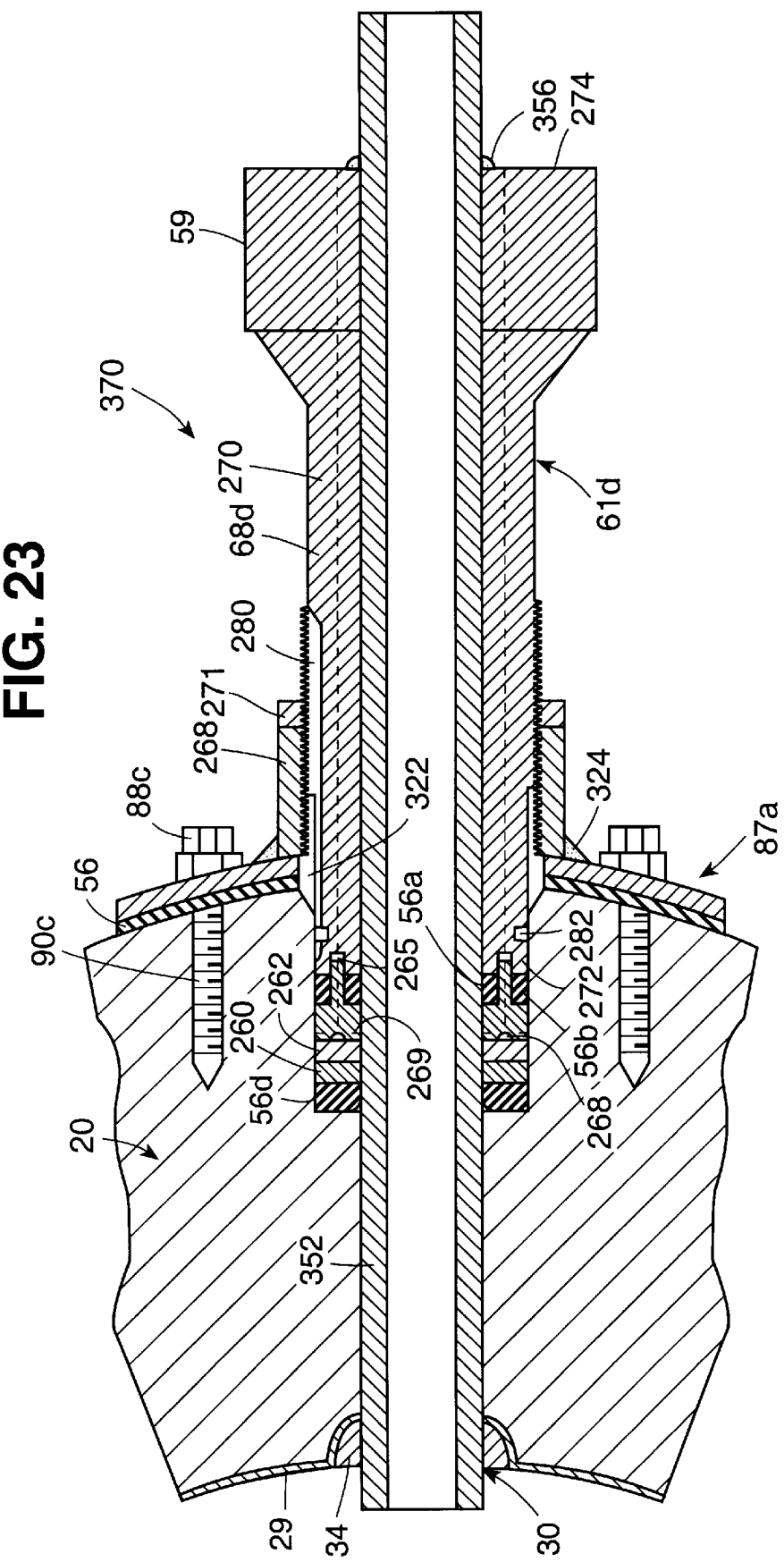
FIG. 23 is a sectional view similar to FIG. 19 depicting a repair assembly for an existing nozzle which incorporates a feature or features of FIG. 19.
Figure 24:
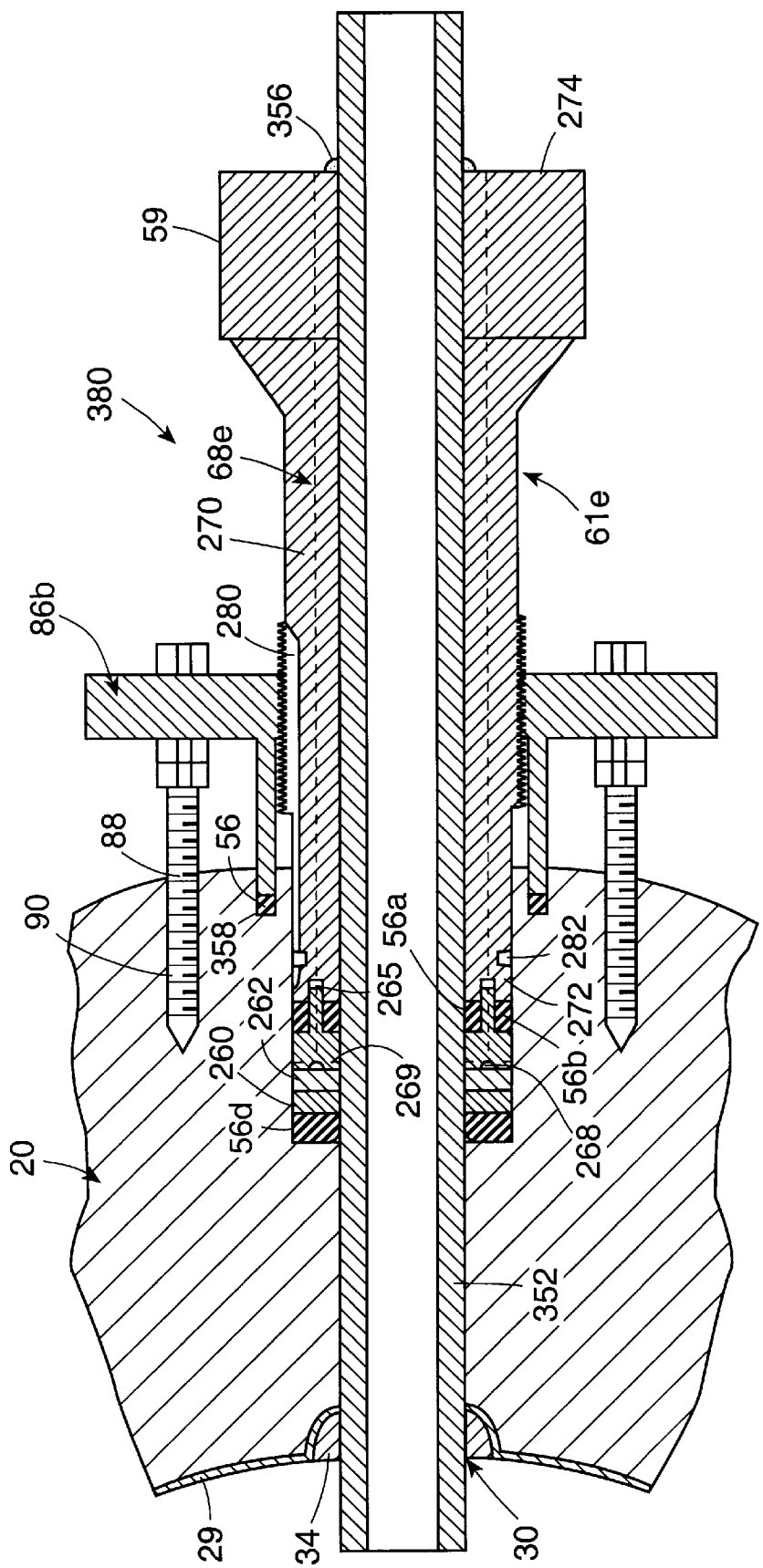
FIG. 24 is a sectional view similar to FIG. 20 depicting a repair assembly for an existing nozzle which incorporates a feature or features of FIG. 20.

In the nozzle repair assemblies 360, 370 and 380 depicted in FIGS. 22–24, respectively, the techniques of the partial nozzle replacement assemblies 300, 320 and 330 of FIGS. 18–20, respectively, are applied to repairing a nozzle. The nozzle repair assemblies 360, 370 and 380 are the same as the partial nozzle replacement assemblies 300, 320 and 330 of FIGS. 18–20, except that the entire existing nozzle 352 is left within the bore. Also, the existing nozzle 352 in nozzle repair assemblies 360, 370 and 380 may be welded to the respective sleeve with a fillet weld 356 to provide for further attachment of the nozzle 352 to the vessel 20, functioning as an anti-ejection device, or the respective sleeves may be modified as shown in FIG. 26 for the reason stated above in connection with FIG. 21. The nozzle repair assemblies 360, 370 and 380 of FIGS. 22–24 utilize the leak paths of FIGS. 18–20 and other elements shown in FIGS. 18–20, respectively. Another difference between the embodiments of FIGS. 22 and 24 and those of FIGS. 18 and 20 and is that in FIGS. 22 and 24 the exterior mechanical seal between the respective sleeve or flange is made with packing material in a short enlarged bore diameter section 358 defining an annular groove between the bore and the sleeve at the OD of the vessel, while in FIGS. 18 and 20 the seal is made on the exterior surface of the vessel OD with gasket material.

Figure 25:
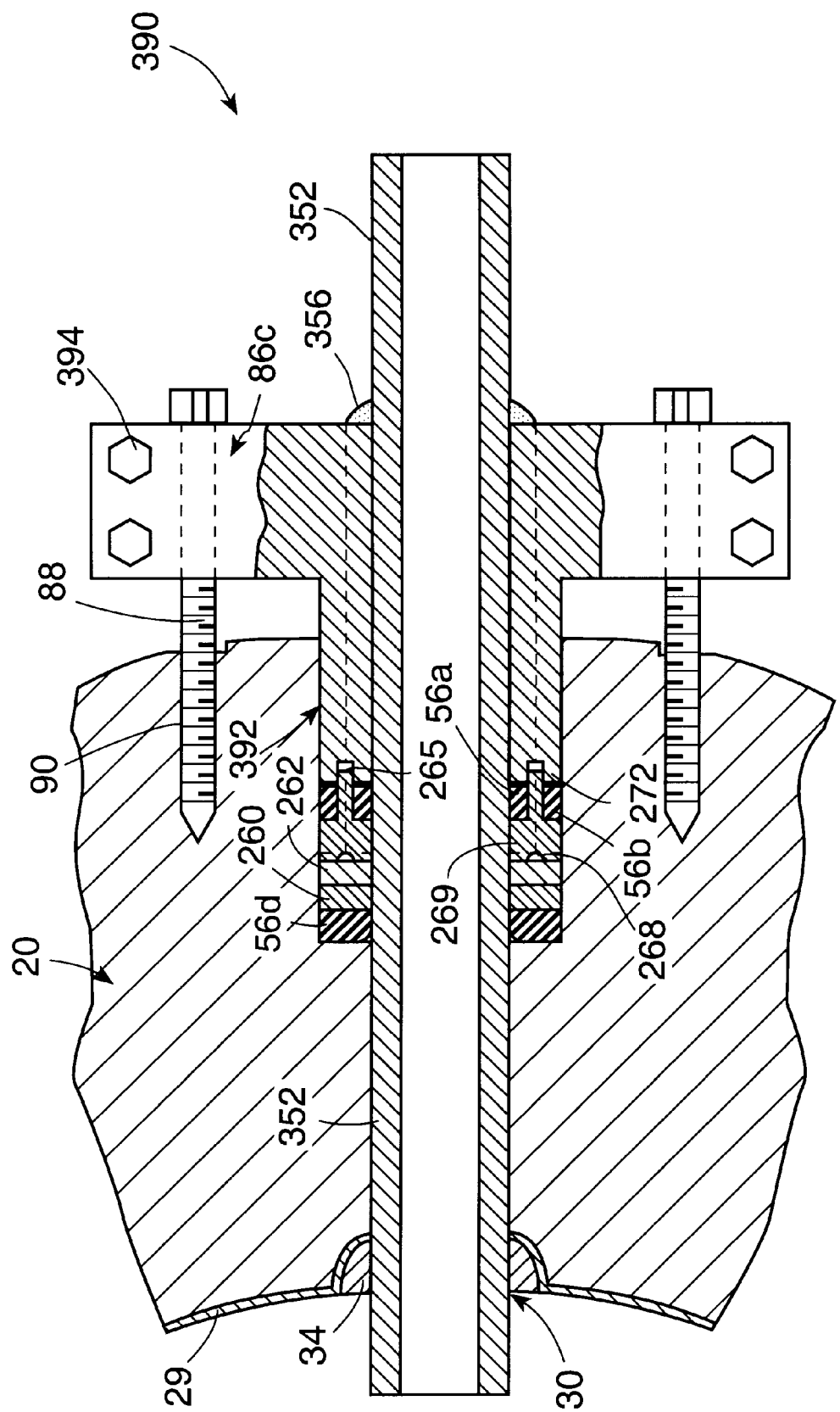
FIG. 25 is a section view similar to that of FIG. 24 depicting a repair assembly for an existing nozzle which incorporates the features of FIG. 24 and allows the repair to be installed without cutting the existing nozzle.

The nozzle repair assembly 390 depicted in FIG. 25 is a combination of the nozzle repair assembly 360 and 380 in FIGS. 22 and 24. Nozzle repair assembly 390 utilizes a flange 86*c* similar to the clamp device 86*b* of FIG. 24 and a portion 392 of a drive sleeve similar to the drive sleeve 68*c* of FIG. 22. In addition, the flange 86*c* is split and is clamped to the existing nozzle 352 by bolts 394. The split flange 86*c* frictionally engages the existing nozzle to mechanically attach the nozzle to the vessel. This enables the sleeve portion 392 and the clamp device 86c to be attached to the existing nozzle 352 and the vessel 20 without cutting the existing nozzle and without the need for a weld to provide additional structural support. The sleeve portion 392 mechanically seals the existing nozzle 352 in the same manner as the partial nozzle replacement assembly of FIG. 18 and the nozzle repair assembly of FIG. 22 are sealed, except that the clamp device 86c may be tightened to the vessel after initial assembly and tightening of the clamp device 86c, without breaking any weld, by tightening bolts 88 to compress the mechanical seals therein after initial installation. However, if desired, the nozzle 352 may also be fillet welded to the clamp device 86c to provide additional support.

FIG. 26 depicts a technique for attaching the sleeve of FIGS. 21–24 to an existing nozzle 352 so that the sleeve may be tightened to the bore while attached to the existing nozzle. In the nozzle -to- sleeve attachment 400, the nozzle 352 is welded to a compression ring 402, and the sleeve 61 is rotatably coupled to the compression ring 402 rather than being welded to the existing nozzle 352. The compression ring 402 is internally threaded, and an externally threaded tubular sleeve 404 through which the existing nozzle 352 passes is threaded to the compression ring 402. The tubular sleeve section 404 has wrenching flats 59 is rotatably coupled to the drive sleeve 61 by a mechanical clamp arrangement 406 comprising circumferential grooves 408, 409 in adjacent ends of the drive sleeve 61 and the tubular sleeve section 404, and a split clamp 412 having annular projections 414, 415. The annular projections 414, 415 of the split clamp 412 are rotatably received and engaged in grooves 408, 409, respectively. A jam nut 418 is threaded on the tubular sleeve section 404 against the compression ring 402. After the drive sleeve 61 has initially been installed and tightened, the tubular sleeve section 404, compression ring 402 and jam nut 418 (loosened) are installed and clamped to the drive sleeve 61 with the clamp arrangement 406, as follows. The compression ring 402 is welded to the existing nozzle with the fillet weld 356. The tubular sleeve section 404 is turned in a counter clockwise direction such that tubular sleeve section 404 rotates out of compression ring 402 and compresses the nozzle, with minimal loading, into the compression ring 402 to load the drive sleeve 61. The jam nut 418 is then tightened. During service, the loading on the drive sleeve 61 may be adjusted without breaking the fillet weld 356 by backing off the jam nut 418 and rotating the tubular sleeve section 404 using the wrenching flats 59. The jam nut 418 is then re-tightened against the compression ring 402. Also, depending upon the torqued relationship of the compression ring 402, drive sleeve 404 and jam nut 418, the nozzle-to-sleeve attachment 400 may provide either tension or no load to the existing nozzle 352, or compression as described above. Where the existing nozzle 352 is either tensioned or not loaded, ring 402 would not be referenced to as a "compression" ring.

FIG. 27 depicts a technique for attaching the sleeve of FIGS. 21–24 to an existing nozzle 352 so that the sleeve may be tightened to the bore while attached to the existing nozzle. In the nozzle -to- sleeve attachment 400 (FIG. 26), the nozzle 352 is welded to a compression ring 402, and the sleeve 61 is rotatably coupled to the compression ring 402 which is welded to the existing nozzle 352. In the embodiment of FIG. 27 no weld to the nozzle is employed, and instead the nozzle is frictionally clamped to the sleeve 61 by a split clamp 420. The split clamp 420 includes the annular projection 414 of clamp 412 which is rotatably received and engaged in the groove 408 of the sleeve 61. The other end of the split clamp 420 includes a split ring 424 extending into frictional engagement with the nozzle 352. Tightening the bolt 394 compresses the split ring 424 around the nozzle 352 to frictionally clamp the nozzle. The sleeve 61 may be tightened simply by loosening bolts 394 on the split clamp 420. Once sleeve 61 is tightened, bolts 394 are retorqued.

As mentioned above, after implementing a repair according to the embodiments of FIGS. 21–25, a full or partial nozzle replacement may be made later as described herein for the applicable replacement, e.g., FIGS. 17–20. For example, after a repair according to FIGS. 22, 23 or 24 was made, a partial nozzle replacement according to FIGS. 18, 19 or 20, respectively, may be made, and after the repair shown in FIG. 22 was made, the full nozzle replacement shown in FIG. 17 may be made. Other variations will be apparent to those of skill in the art from the disclosure herein.

As also mentioned above, the implementations described herein of the nozzle replacements and repairs avoid all or some of the problems discussed above, and the embodiment of FIG. 17 avoids all of the problems discussed above. The partial nozzle replacements, such as the embodiment of FIG. 18, avoid all the concerns except that of continued cracking. Partial nozzle replacements that do not have sealing between the new and existing nozzles, such as the embodiment of FIG. 11, may not over come all the corrosion concerns if they are placed in an environment that is not stagnant. While further analysis, evaluation and information is necessary to determine whether all of the embodiments disclosed herein are acceptable for the life of the facility, they are all believed to be acceptable for at least short term, most likely long term, and in most cases the life of plant given that they are installed in the locations for which they were designed, e.g., those embodiments with a gap between the existing and new partial nozzle are in stagnant environments, and repaired nozzles include fracture mechanic evaluations justifying that the nozzle will not continue to crack beyond the seal. However, the repair embodiments and the partial nozzle replacement embodiments not employing seals between the existing and new partial nozzle (in environments which may not be suitable for long term corrosion concerns) could at least be used for an interim period until such time it was determined necessary or prudent to replace the repaired nozzle or partial nozzle with one of the other full or partial nozzle replacement embodiments described herein. In certain circumstances, such as particular plant modes of operation, one repair or replacement embodiment or technique may be more suitable than another given these conditions. Those experienced in the art are capable of making the determination as to whether or not a particular embodiment or technique used for a particular application can be considered short term, long term, or a life of plant repair or replacement. In the event the repair or replacement is considered as interim and it becomes necessary, those experienced in the art can select the appropriate full or partial nozzle replacement that corresponds to the repair or partial nozzle previously used.

As indicated above, rather than replace all or part of an existing nozzle or repair an existing nozzle, the invention can be applied to provide a plug, particularly for a heater sleeve. For example, in the case of a failed heater and heater sleeve, the heater sleeve may be fully or partially removed and replaced as described above but with a plug or capped nozzle rather than a nozzle due to the fact that a new heater may not be available.

All of the embodiments depicted in FIGS. 3–26 may be used in large bore piping, as well as pressure vessels in general, and do not require entry into the vessel or pipe or a remote system to install them.

In the claims, the term vessel is used in a broad sense and, unless otherwise indicated, is meant to include, but not to be limited to, vessels, piping, etc., of different types which may operate under pressure and which may be used in different nuclear and non-nuclear ASME pressure vessel applications, and the term nozzle is used in a broad sense and is meant to include, but not be limited to, nozzles, sleeves, large bore pipes, pipe portions, etc. Also, where applicable in the claims, "nozzle" encompasses a nozzle assembly, which may include a nozzle having one or more parts, seals, one or more anti-rotation devices, and one or more leak paths.

While the invention has been described and illustrated in connection with preferred embodiments, many variations and modifications, as will be evident to those skilled in this art, may be made without departing from the spirit and scope of the invention. For example, it will be apparent that one or more features in one embodiment may be applicable to other embodiments, or applied to a full or partial nozzle replacement, or to a repair. Although many examples are described above, specific reference of the applicability of a feature described in connection with one embodiment is not made in every other applicable embodiment One such example is that the thrust bearing 202 in FIG. 13 may be used in the embodiments depicted in many of the other figures. Other examples will be apparent to those of skill in this art.

Therefore, the invention, as set forth in the appended claims, is not to be limited to the precise details of construction set forth above, as such variations and modifications are intended to be included within the spirit and scope of the invention as defined in the appended claims.

What is claimed is:

1. The combination of a nozzle assembly and an ASME pressure vessel having a bore, comprising:
    a nozzle stub coaxial with said bore which opens to the interior of said vessel, extends therefrom part way into said bore and terminates therein, said nozzle stub being welded to said vessel where said bore opens to the interior of said vessel;
    a partial nozzle extending from the vicinity of said nozzle stub in said bore, through said bore and exiting said bore to the exterior of said vessel, said partial nozzle having at least one section within said bore coaxial with said nozzle stub which has an outer diameter larger than the outer diameter of said nozzle stub;
    a mechanical coupling of said partial nozzle to said vessel operative to provide a mechanical attachment of said partial nozzle to said vessel, said mechanical coupling not including a weld between said partial nozzle and said vessel;
    said bore having a smaller diameter section surrounding at least part of said nozzle stub and a larger diameter section surrounding said at least one section of said partial nozzle, said bore having a shoulder where the smaller and larger diameter sections thereof meet;
    at least a part of said at least one section of said partial nozzle in said bore and at least a part of said shoulder in said bore having a same diameter; and
    a mechanical non-welded seal of said partial nozzle in said bore comprising sealing material positioned in said bore compressed by action of said at least one section of said partial nozzle and said shoulder of said bore.

2. The combination of claim 1 wherein said mechanical coupling comprises interior threads in said bore and exterior threads on said partial nozzle positioned to engage said interior threads in said bore, said mechanical attachment including structure in said bore and structure on said partial nozzle configured to engage in said bore in a tightened condition of said partial nozzle in said bore to provide said mechanical attachment of said partial nozzle to said vessel.

3. The combination of claim 1 wherein said mechanical coupling comprises bolts threaded to said vessel and a flange, said mechanical coupling including a coupling of said bolts to said flange and a coupling of said flange to said partial nozzle.

4. The combination of claim 3 comprising another mechanical seal of said partial nozzle to said vessel which includes sealing material compressed between said flange and the exterior of said vessel.

5. The combination of claim 1 wherein said partial nozzle has another section within said bore of a smaller diameter than said at least one section positioned adjacent said nozzle stub, said partial nozzle having a flange in said bore where said another section and said at least one section of said partial nozzle meet positioned in said bore in the vicinity of said shoulder said sealing material being positioned in said bore compressed between said flange and said shoulder to provide said mechanical seal thereat.

6. The combination of claim 5 comprising another mechanical seal in said bore between said nozzle stub and said another section of said partial nozzle.

7. The nozzle assembly of claim 1 wherein said partial nozzle comprises a nozzle body which includes said at least one section, and a drive sleeve, said bore having a threaded section adjacent the exterior of said vessel, said drive sleeve being threaded to said threaded section of said bore, said nozzle body passing through said sleeve to the exterior of said vessel, at least a portion of said sleeve having said same diameter, whereby said nozzle body is mechanically attached to said vessel and said sealing material is compressed by said sleeve threaded and tightened in said bore.

8. The combination of a nozzle assembly and a pressure vessel of a nuclear power facility having a bore, comprising:
    a full nozzle extending from the interior of said vessel, through said bore and exiting said bore to the exterior of said vessel;
    a mechanical coupling of said full nozzle to said vessel operative to provide for a mechanical attachment of said full nozzle to said vessel said mechanical coupling not including a weld between said full nozzle and said vessel; and
    a mechanical, non-welded seal of said full nozzle to said vessel.

9. The combination of claim 8 wherein said full nozzle has a tapered section within said bore which increases in diameter away from the interior of said vessel, said bore correspondingly having a tapered section which correspondingly increases in diameter away from the interior of said vessel, said tapered section of said full nozzle engaging said tapered section of said bore directly or with sealing material therebetween sufficient to provide said mechanical seal thereat.

10. The combination of claim 8 wherein said full nozzle, at least within said bore, is one-piece excluding any sealing material.

11. The combination of claim 8 wherein said full nozzle comprises:
    a nozzle body extending from the interior of said vessel, through said bore and exiting said bore to the exterior of said vessel, and a drive sleeve sized to concentrically slidably fit on said nozzle body;
    said mechanical coupling comprising exterior threads on said drive sleeve and interior threads in said bore adjacent to the exterior of said vessel positioned to engage said threads on said drive sleeve to attach said drive sleeve to said vessel, and an annular flange on said nozzle body in said bore engaged by said drive sleeve.

12. The combination of claim 11 wherein said mechanical seal includes sealing material in said bore compressed between said annular flange and an end of said sleeve adjacent thereto.

13. The combination of claim 8 wherein said full nozzle comprises a nozzle body extending from the interior of said vessel through said bore and exiting said bore and a drive sleeve surrounding a portion of said nozzle body in said bore adjacent the exterior of said vessel, said bore having a larger diameter section adjacent the exterior of said vessel surrounding said drive sleeve and a smaller diameter section adjacent the interior of said vessel surrounding said nozzle body and defining a shoulder therebetween, said mechanical coupling comprising exterior threads on said drive sleeve in said bore and interior threads in said larger diameter section of said bore positioned to engage said threads on said drive sleeve to attach said drive sleeve to said vessel, and exterior threads on said nozzle body extending from inside said drive sleeve to outside said drive sleeve and interior threads on said drive sleeve positioned to engage said exterior threads on said nozzle body to attach said nozzle body to said drive sleeve, and a nut threaded to said nozzle body outside said drive sleeve tightened against said drive sleeve, said mechanical seal comprising sealing material positioned and compressed between an end of said drive sleeve in said bore and said shoulder in said bore.

14. The combination of claim 8 comprising a sleeve positioned in said bore extending from the interior of said vessel and terminating in said bore, said sleeve having a tubular OD and a section with a tapered ID which increases in diameter away from the interior of said vessel, said full nozzle having a tapered section within said sleeve corresponding to the taper of said sleeve tapered section, said mechanical seal being formed by sealing contact of said tapered sections of said sleeve and said full nozzle.

15. The combination of claim 13 comprising another mechanical seal in said bore, said full nozzle comprising a sleeve in said bore adjacent an end of said nozzle body in said bore interference fitted with said bore to form said another mechanical seal thereat.

16. The combination of a nozzle assembly and an ASME pressure vessel having a bore, comprising:
 a sleeve opening to the interior of said vessel and extending part way into said bore, said sleeve being shrink fit to mechanically attach it to said vessel and mechanically seal it in the bore;
 a nozzle extending from at least adjacent said sleeve in said bore, through said bore and exiting said bore to the exterior of said vessel;
 a mechanical coupling of said nozzle to said vessel operative to provide a mechanical attachment of said nozzle to said vessel, said mechanical coupling not including a weld between said nozzle and said vessel; and
 a mechanical seal of said nozzle to said vessel.

17. The combination of claim 16 wherein said nozzle has a smaller diameter tubular section within said bore positioned within said first sleeve and a larger diameter tubular section within said bore adjacent said smaller diameter section which meet and define an annular flange thereat, said bore correspondingly having a smaller diameter section surrounding said first sleeve and a larger diameter section adjacent said smaller diameter section which meet and define an annular shoulder thereat, said mechanical seal comprising sealing material positioned in said bore compressed under action at least of said annular flange and said annular shoulder.

18. The combination of a nozzle assembly and an ASME pressure vessel having a bore, comprising:
 a nozzle stub which opens to the interior of said vessel and extends therefrom part way into said bore, said nozzle stub being welded to said vessel where said bore opens to the interior of said vessel;
 a partial nozzle extending from the vicinity of said nozzle stub in said bore, through said bore and exiting said bore to the exterior of said vessel;
 a mechanical coupling of said partial nozzle to said vessel operative to provide a mechanical attachment of said partial nozzle to said vessel, said mechanical coupling not including a weld between said partial nozzle and said vessel and comprising bolts threaded to said vessel, a flange and a coupling of said bolts to said flange and a coupling of said flange to said partial nozzle; and
 a mechanical seal of said partial nozzle to said vessel.

19. The combination of claim 18 wherein said coupling of said flange to said nozzle comprises a sleeve threaded to said partial nozzle which is coupled to said flange.

20. The combination of claim 18 wherein said seal of said nozzle to said vessel is in said bore, and comprising another seal of said nozzle to said vessel including sealing material compressed between said flange and the exterior of said vessel.

21. The combination of claim 20 wherein said partial nozzle has a smaller diameter tubular section within said bore positioned adjacent said nozzle stub and a larger diameter tubular section within said bore adjacent said smaller diameter section which meet and define an annular flange thereat, said bore correspondingly having a smaller diameter section adjacent said nozzle stub and a larger diameter section adjacent said smaller diameter section which meet and define an annular shoulder thereat, said mechanical seal comprising sealing material positioned in said bore compressed under action at of said annular flange and said annular shoulder.

22. The combination of claim 21 comprising another mechanical seal in said bore between said nozzle stub and said partial nozzle.

23. The combination of claim 18 wherein said partial nozzle has a tubular section within said bore adjacent said nozzle stub which has an inner diameter larger than the outer diameter of said nozzle stub tubular section, said tubular section of said partial nozzle overlapping said tubular section of said nozzle stub;
 said bore having a smaller diameter section adjacent said nozzle stub tubular section and a larger diameter section adjacent thereto surrounding said tubular section of said partial nozzle, said bore having an annular shoulder where said smaller and larger diameter sections thereof meet;
 said mechanical coupling comprising an end of said tubular section in said bore of said partial nozzle compressively engaging said shoulder in said bore;
 said mechanical seal between said nozzle stub and said partial nozzle comprising sealing material surrounding said tubular section of said nozzle stub compressed between said bore shoulder and an end of said tubular section of said partial nozzle.

24. The combination of claim 19 wherein said sleeve is threaded to said partial nozzle exteriorly of said vessel extending beyond a side of said flange facing away from said vessel, said sleeve in a tightened condition thereof engaging said flange and being coupled to said flange by a weld.

25. The combination of a nozzle assembly and a pressure vessel of a nuclear power facility having a bore, comprising:

a full nozzle extending from the interior of said vessel, through said bore and exiting said bore to the exterior of said vessel, a flange coupled to said full nozzle outside of said bore, said full nozzle and said bore having structure which engages under compressive loading of said nozzle in said bore and bolts attaching said flange to the exterior of said vessel and providing said compressive loading of said nozzle in said bore; and a mechanical seal, in said bore, of said full nozzle to said vessel.

26. The combination of claim 25 wherein said full nozzle has a tapered section within said bore which increases in diameter away from the interior of said vessel, said bore correspondingly having a tapered section which correspondingly increases in diameter away from the interior of said vessel, said tapered section of said full nozzle sealing with said tapered section of said bore directly or with sealing material compressed therebetween to provide said mechanical seal thereat.

27. The combination of claim 26 wherein said full nozzle, at least within said bore, is one-piece excluding any sealing material.

28. The combination of claim 26 wherein said full nozzle comprises:

a nozzle body extending from the interior of said vessel, through said bore and exiting said bore to the exterior of said vessel, said nozzle body including said tapered section of said full nozzle and a tubular section positioned adjacent thereto on a side thereof away from the interior of said vessel, said nozzle body having an annular flange where said tapered section and said tubular section meet; and a sleeve sized to concentrically slidably fit on said tubular section of said nozzle body in engagement with said annular flange;

said flange being coupled to said sleeve and providing said compressive loading to said nozzle through said sleeve and said annular flange.

29. The combination of claim 25 wherein said flange is a split flange.

30. The combination of an initial installation, replacement or repair nozzle assembly and an ASME pressure vessel having a bore, comprising:

a nozzle extending from and exiting said bore to the exterior of said vessel, said nozzle being attached to said vessel;

a mechanical seal in said bore between said nozzle and said vessel; and structure forming a leak path along which any liquid in said bore which leaks past said mechanical seal in said bore can flow to the exterior of said vessel, said structure forming at least one passage having a circumferential width of substantially less than 360 degrees through which leaking liquid can be channeled.

31. The combination of claim 30 comprising a first mechanical seal and a second mechanical seal in said bore between said nozzle and said vessel, said first mechanical seal being closer to said vessel interior than said second mechanical seal, said leak path being provided from said second mechanical seal extending to the exterior of said vessel.

32. The combination of claim 31 comprising another leak path form said first mechanical seal extending to the exterior of said vessel.

33. The combination of claim 30 wherein said nozzle is a full nozzle mechanically attached to said vessel extending from the interior to the exterior of said vessel.

34. The combination of clam 30 wherein said nozzle is a full nozzle welded to said vessel extending from the interior to the exterior of said vessel.

35. The combination of claim 30 comprising means for mechanically attaching said nozzle to said vessel.

36. The combination of a nozzle assembly and a pressure vessel of a nuclear power facility having a bore, comprising:

a nozzle extending from and exiting said bore to the exterior of said vessel;

a mechanical coupling of said nozzle to said vessel operative to provide for a mechanical attachment of said nozzle to said vessel, said mechanical coupling not including a weld between said nozzle and said vessel; and an anti-rotation device coupled to at least one part of said nozzle and to said vessel without a weld to said vessel to resist rotation of said at least one part in said bore.

37. The combination of claim 36 wherein said anti-rotation device comprises key stock engaging with said at least one part and said vessel in said bore.

38. The combination of claim 36 wherein said anti-rotation device comprises a mechanical engagement of said at least one part with another part welded to said nozzle.

39. The combination of a nozzle and an ASME pressure vessel having a bore, said nozzle being welded to said vessel and passing through said bore, said bore having a diameter slightly larger than a diameter of said nozzle adjacent the interior of said vessel and a diameter substantially larger than a diameter of said nozzle adjacent the exterior of said vessel, said nozzle being welded to said vessel at the opening of said bore to the vessel interior; said combination comprising:

a sleeve extending into said bore surrounding a substantial portion of said nozzle in said bore where the diameter thereof is substantially larger than the diameter of said nozzle;

a mechanical coupling of said sleeve to said vessel and said mechanical coupling not including a weld;

a mechanical seal of said sleeve to said vessel within said bore surrounding said nozzle.

40. The combination of claim 39 wherein said mechanical seal of said sleeve to said vessel comprises an annular shoulder where the larger and smaller diameter bore portions meet and compressed sealing material between an end of said sleeve in said bore and said shoulder.

41. The combination of claim 39 wherein said mechanical seal of said sleeve to said vessel comprises a taper in said bore transitioning between a larger diameter closer to the vessel exterior and a smaller diameter closer to the vessel interior, a corresponding taper in said sleeve, and said mechanical attachment of said sleeve to said vessel forcing the tapered portions of said bore and sleeve into sealing engagement.

42. The combination of claim 39 wherein said mechanical attachment of said sleeve to said vessel comprises exterior threads on sleeve and interior threads in said bore which engage.

43. The combination of claim 39 wherein said sleeve extends exteriorly of said vessel surrounding said nozzle, a flange coupled to said sleeve exteriorly of said vessel, and bolts coupled to said flange attached to the vessel exterior.

44. The combination of claim 43 comprising another mechanical seal between said flange and the vessel.

45. The combination of claim 40 wherein said sleeve extends exteriorly of said vessel surrounding said nozzle, said nozzle extending from said sleeve, and comprising a weld between said nozzle and said sleeve outside of said bore.

46. The combination of claim 45 comprising a tubular element, said weld attaching said nozzle to said tubular element, and a mechanical coupling rotatably attaching said sleeve to said tubular element, whereby said sleeve may be rotated in said bore while welded to said nozzle.

47. The combination of claim 39 wherein said sleeve extends exteriorly of said vessel surrounding said nozzle, said nozzle extending from said sleeve, and a clamp frictionally engaging said nozzle and attached to said sleeve.

48. The combination of claim 47 comprising bolts attached to the vessel exterior and a flange, said flange being coupled to said bolts and to said clamp.

49. A method of mechanically attaching and mechanically sealing a nozzle welded to a pressure vessel of a nuclear power facility which extends into a bore of the vessel and exteriorly of the vessel, comprising:
  enlarging the diameter of the bore to be substantially larger than that of the nozzle for a portion thereof adjacent the exterior of the vessel;
  mechanically attaching a sleeve to the vessel which extends into the bore surrounding a substantial portion of the nozzle in the enlarged bore; and
  mechanically sealing the sleeve within the bore surrounding the existing nozzle.

50. The method of claim 49 wherein the step of mechanically sealing the sleeve comprises forming an annular shoulder where the enlarged and existing bore portions meet, positioning sealing material between the end of the sleeve in the bore and the shoulder, and compressing the sealing material therebetween.

51. The method of claim 50 wherein the step of mechanically sealing the sleeve comprises forming a taper in the bore transitioning between a larger diameter closer to the vessel exterior and a smaller diameter closer to the vessel interior, forming a corresponding taper in the sleeve, and forcing the tapered portions of the bore and sleeve into sealing engagement compressing any sealing material therebetween.

52. The method of claim 50 wherein the step of mechanically attaching the sleeve to the vessel comprises threading the sleeve in the bore.

53. The method of claim 50 wherein the sleeve extends exteriorly of the vessel surrounding the nozzle, and wherein the step of mechanically attaching the sleeve to the vessel comprises coupling a flange to the vessel with bolts threaded to the vessel and coupling the flange to the sleeve exteriorly of the vessel.

54. The method of claim 53 comprising the step of mechanically sealing the flange to the vessel.

55. The method of claim 53 wherein the sleeve extends exteriorly of the vessel surrounding the nozzle, and comprising the step of welding the existing nozzle to the sleeve outside of the bore.

56. The method of claim 55 wherein the step of mechanically attaching the sleeve to the vessel comprises threading the sleeve in the bore, and wherein the step of welding the sleeve to the existing nozzle comprises welding the sleeve to an element which is rotatably coupled to the sleeve, whereby the sleeve may be rotated in the bore while welded to the existing nozzle.

57. A method of partially replacing an existing nozzle in a pressure vessel of a nuclear power facility which is welded to the vessel where the bore opens to the interior of the vessel, comprising:
  removing a portion of the existing nozzle adjacent the exterior of the vessel and leaving a nozzle stub welded to the vessel where the bore opens to the interior of the vessel and extending part way into the bore;
  mechanically attaching a partial nozzle to the vessel extending from adjacent said nozzle stub in the bore, through the bore and exiting the bore to the exterior of the vessel; and
  mechanically sealing the partial nozzle to the vessel solely within the bore.

58. The combination of an initial installation, replacement or repair nozzle assembly and an ASME pressure vessel having a bore, comprising:
  a nozzle extending from and exiting said bore to the exterior of said vessel, said nozzle being welded to said vessel; and
  means for mechanically sealing said nozzle including sealing material compressed within said bore such that said sealing material may be further compressed to tighten said mechanical seal without breaking said weld.

59. The combination of claim 58 wherein said means for sealing provides two mechanical seals of said nozzle to said vessel and comprising means for independently compressively said seals.

60. The nozzle assembly of claim 58 wherein said means for sealing live-loads said seal.

61. The combination of an initial installation, replacement or repair nozzle assembly and an ASME pressure vessel having a bore, comprising:
  a nozzle stub which opens to the interior of said vessel and extends therefrom part way into said bore, said nozzle stub being welded to said vessel where said bore opens to the interior of said vessel, and a partial nozzle extending from adjacent said nozzle stub in said bore, through said bore and exiting said bore to the exterior of said vessel, said partial nozzle being attached to said vessel;
  a mechanical seal in said bore between said partial nozzle and said vessel; and
  structure forming a leak path along which any liquid in said bore which leaks past said mechanical seal in said bore can flow to the exterior of said vessel.

62. The combination of a nozzle assembly and an ASME pressure vessel having a bore, comprising:
  a nozzle which opens to the interior of said vessel and extends therefrom in said bore, through said bore and exits said bore to the exterior of said vessel;
  a mechanical coupling of said nozzle to said vessel operative to provide for a mechanical attachment of said nozzle to said vessel, said mechanical coupling not including a weld between said nozzle and said vessel, said mechanical coupling comprising bolts threaded to said vessel and a flange, and including a coupling of said bolts to said flange and a coupling of said flange to said nozzle; and a mechanical, non-welded seal of said nozzle to said vessel.

63. The combination of claim 62 wherein said coupling of said flange to said nozzle is operative to compressively load said nozzle to said vessel.

64. The combination of claim 8 wherein said coupling of said flange to said full nozzle is operative to compressively load said full nozzle to said vessel.

65. The combination of an initial installation, replacement or repair nozzle assembly and an ASME pressure vessel having a bore and adapted to contain a corrosive liquid therein without corroding the interior of said vessel, comprising:

- a nozzle extending from and exiting said bore to the exterior of said vessel, said nozzle being attached to said vessel;
- a mechanical seal in said bore between said nozzle and said vessel; and
- structure forming a leak path along which any liquid in said bore which leaks past said mechanical seal in said bore can flow to the exterior of said vessel, said structure forming said leak path which comes into contact with any liquid flowing in said leak path being resistant to corrosion by the corrosive liquid which said vessel is adapted to contain.

* * * * *